US012641379B2

(12) United States Patent
Bhowmik et al.

(10) Patent No.: US 12,641,379 B2
(45) Date of Patent: May 26, 2026

(54) AUDIO SYSTEM WITH EAR-WORN DEVICE AND REMOTE AUDIO STREAM MANAGEMENT

(71) Applicant: Starkey Laboratories, Inc., Eden Prairie, MN (US)

(72) Inventors: Achintya Kumar Bhowmik, Cupertino, CA (US); Gregory John Haubrich, Champlin, MN (US); Paul Shriner, Hopkins, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 208 days.

(21) Appl. No.: 17/786,675

(22) PCT Filed: Dec. 17, 2020

(86) PCT No.: PCT/US2020/065682
§ 371 (c)(1),
(2) Date: Jun. 17, 2022

(87) PCT Pub. No.: WO2021/127226
PCT Pub. Date: Jun. 24, 2021

(65) Prior Publication Data

US 2023/0020019 A1 Jan. 19, 2023

Related U.S. Application Data

(60) Provisional application No. 62/949,202, filed on Dec. 17, 2019.

(51) Int. Cl.
*H04R 25/00* (2006.01)

(52) U.S. Cl.
CPC ....... *H04R 25/554* (2013.01); *H04R 2225/55* (2013.01)

(58) Field of Classification Search
CPC .............. H04R 25/554; H04R 2225/41; H04R 2225/55; H04R 2420/07; H04R 1/1041; H04R 2460/05; H04R 2460/07; H04R 25/50; H04R 27/00; H04R 3/04
USPC .......................................................... 381/315
See application file for complete search history.

(56) References Cited

U.S. PATENT DOCUMENTS 5,461,371 A 10/1995 Matsumoto et al.
6,230,130 B1 5/2001 Castello et al.
(Continued)

FOREIGN PATENT DOCUMENTS

DE 10030915 W 1/2002
EP 2725818 4/2014
(Continued)

OTHER PUBLICATIONS

"Eye Tracking & Access Technologies," PRC-Saltillo Product Overview page accessible at least as early as Dec. 9, 2019 at URL <https://www.prentrom.com/prc_advantage/eye-tracking-and-access-technologies> (11 pages).
(Continued)

*Primary Examiner* — Phylesha Dabney
(74) *Attorney, Agent, or Firm* — Pauly, DeVries Smith & Deffner LLC

(57) ABSTRACT

Embodiments herein relate to audio systems including an ear-worn device and providing for remote audio stream management. In an embodiment, an audio system is included having an ear-worn device. The audio system can be configured to receive a notification regarding availability of a remote audio stream, query a wearer of the ear-worn device regarding the remote audio stream, receive an input from the wearer of the ear-worn device regarding the remote audio stream, selectively receive the remote audio stream, and selectively play the remote audio stream through the electroacoustic transducer. Other embodiments are also included herein.

20 Claims, 14 Drawing Sheets

(56) References Cited

U.S. PATENT DOCUMENTS

| | | | |
|---|---|---|---|
| 6,498,955 | B1 | 12/2002 | McCarthy et al. |
| 8,780,201 | B1 | 7/2014 | Scalisi et al. |
| 8,923,543 | B2 | 12/2014 | Sacha et al. |
| 9,055,202 | B1 | 6/2015 | Scalisi et al. |
| 9,100,694 | B1 | 8/2015 | Chandel et al. |
| 9,136,881 | B2 | 9/2015 | Groeschel et al. |
| 9,167,356 | B2 | 10/2015 | Higgins et al. |
| 9,179,107 | B1 | 11/2015 | Scalisi et al. |
| 9,179,109 | B1 | 11/2015 | Kasmir et al. |
| 9,210,518 | B2 | 12/2015 | Zhang |
| 9,219,964 | B2 | 12/2015 | Merks |
| 9,742,890 | B2 | 8/2017 | Gibbons |
| 9,794,701 | B2 | 10/2017 | Flood et al. |
| 9,848,273 | B1 | 12/2017 | Helwani et al. |
| 9,940,928 | B2 | 4/2018 | Haubrich et al. |
| 10,543,371 | B2 | 1/2020 | Hunt et al. |
| 10,600,291 | B2 | 3/2020 | Kashar |
| 10,605,470 | B1 | 3/2020 | Saxena et al. |
| 10,606,470 | B2 | 3/2020 | Ording |
| 10,743,115 | B2 | 8/2020 | Frederiksen et al. |
| 10,827,249 | B1 | 11/2020 | Pine et al. |
| 11,304,013 | B2 | 4/2022 | Burwinkel et al. |
| 11,812,213 | B2 | 11/2023 | Bhowmik et al. |
| 11,825,272 | B2 | 11/2023 | Burwinkel et al. |
| 12,035,110 | B2 | 7/2024 | Degen |
| 12,256,199 | B2 | 3/2025 | Burwinkel et al. |
| 2005/0172006 | A1 | 8/2005 | Hsiang |
| 2005/0231356 | A1 | 10/2005 | Bish et al. |
| 2006/0023900 | A1 | 2/2006 | Erhart et al. |
| 2008/0140868 | A1 | 6/2008 | Kalayjian et al. |
| 2008/0181435 | A1 | 7/2008 | Ozaki et al. |
| 2009/0031336 | A1 | 1/2009 | Chavez et al. |
| 2009/0076816 | A1 | 3/2009 | Bradford et al. |
| 2012/0060176 | A1 | 3/2012 | Chai et al. |
| 2012/0102409 | A1 | 4/2012 | Fan et al. |
| 2014/0223461 | A1 | 8/2014 | Hatambeiki et al. |
| 2015/0105029 | A1 | 4/2015 | Russell et al. |
| 2017/0318145 | A1 | 11/2017 | Gibbons |
| 2017/0332183 | A1 | 11/2017 | Shennib |
| 2018/0081619 | A1 | 3/2018 | Peters et al. |
| 2018/0204576 | A1 | 7/2018 | Dhoot et al. |
| 2018/0317837 | A1 | 11/2018 | Burwinkel et al. |
| 2018/0343527 | A1 | 11/2018 | Edwards |
| 2019/0246216 | A1 | 8/2019 | Frederiksen et al. |
| 2019/0278555 | A1 | 9/2019 | Carvajal et al. |
| 2019/0281389 | A1 | 9/2019 | Gordon et al. |
| 2020/0069281 | A1 | 3/2020 | Chan et al. |
| 2020/0086133 | A1 | 3/2020 | Wang et al. |
| 2020/0260199 | A1 | 8/2020 | Burwinkel et al. |
| 2020/0288251 | A1 | 9/2020 | Kuipers |
| 2022/0103927 | A1 | 3/2022 | Bhowmik et al. |
| 2022/0286792 | A1 | 9/2022 | Burwinkel et al. |
| 2022/0337962 | A1 | 10/2022 | Degen |
| 2024/0205584 | A1 | 6/2024 | Bhowmik et al. |
| 2024/0205618 | A1 | 6/2024 | Burwinkel et al. |

FOREIGN PATENT DOCUMENTS

| | | |
|---|---|---|
| EP | 3176782 | 6/2017 |
| WO | 2017120065 | 7/2017 |
| WO | 2020163722 | 8/2020 |
| WO | 2020236911 | 11/2020 |
| WO | 2021041522 | 3/2021 |
| WO | 2021127226 | 6/2021 |

OTHER PUBLICATIONS

File History for U.S. Appl. No. 16/784,947 downloaded Aug. 18, 2022 (200 pages).

"How NFL Equipment Works," HowStuffWorks article that mentions wireless communication in NFL helmets has been used since 1994. Accessible at URL <https://entertainment.howstuffworks.com/fb-equip5.htm> at least as early as Apr. 9, 2003 (28 pages).

"International Preliminary Report on Patentability," for PCT Application No. PCT/US2020/017222 mailed Aug. 19, 2021 (14 pages).

"International Preliminary Report on Patentability," for PCT/US2020/047967 mailed Mar. 10, 2022 (9 pages).

"International Preliminary Report on Patentability," for PCT Application No. PCT/US2020/065682 mailed Jun. 30, 2022 (11 pages).

"International Search Report and Written Opinion," for PCT Application No. PCT/US2020/017222 mailed Jul. 6, 2020 (21 pages).

"International Search Report and Written Opinion," for PCT Application No. PCT/US2020/047967 mailed Oct. 22, 2020 (13 pages).

"International Search Report and Written Opinion," for PCT Application No. PCT/US2020/065682 mailed Mar. 16, 2021 (15 pages).

"Invitation to Pay Additional Fees," for PCT Application No. PCT/US2020/017222 mailed May 13, 2020 (17 pages).

Allan, Patrick "Build some DIY, Smart Switching Baby Monitor Headphones," Synopsis of Ben Heck Show episode. Published Jan. 4, 2017 and accessible at URL <https://lifehacker.com/build-some-diy-smart-switching-baby-monitor-headphones-1790775604> (4 pages).

Martins Pereira, Cesar Augusto, et al. "Development and Evaluation of a Head-Controlled Human-Computer Interface with Mouse-Like Functions for Physically Disabled Users," Clinics 2009; 64(10): 975-81 (8 pages).

Zhang, Ben, et al. "HOBS: Head Orientation-Based Selection in Physical Spaces," SUI 2014, Oct. 4-5, Honolulu, HI, USA.

"Non-Final Office Action," for U.S. Appl. No. 17/489,041 mailed Jan. 10, 2023 (15 pages).

"Non-Final Office Action," for U.S. Appl. No. 17/700,926 mailed Jan. 17, 2023 (17 pages).

"Notice of Allowance," for U.S. Appl. No. 17/489,041 mailed Jul. 5, 2023 (15 pages).

"Notice of Allowance," for U.S. Appl. No. 17/700,926 mailed Jul. 13, 2023 (15 pages).

"Response to Non-Final Office Action," for U.S. Appl. No. 17/489,041, filed Apr. 10, 2023 (9 pages).

"Response to Non-Final Office Action," for U.S. Appl. No. 17/700,926, filed Apr. 11, 2023 (8 pages).

"Non-Final Office Action," for U.S. Appl. No. 18/502,576 mailed Jul. 17, 2024 (28 pages).

"Communication Pursuant to Article 94(3) EPC," for European Patent Application No. 20768447.3 mailed Dec. 18, 2023 (11 pages).

"Non-Final Office Action," for U.S. Appl. No. 17/638,615 mailed Dec. 1, 2023 (17 pages).

"Non-Final Office Action," for U.S. Appl. No. 18/512,651 mailed Jun. 3, 2024 (8 pages).

"Notice of Allowance," for U.S. Appl. No. 17/638,615 mailed Feb. 28, 2024 (15 pages).

"Response to Non-Final Rejection," mailed on Dec. 1, 2023, for U.S. Appl. No. 17/638,615, submitted via EFS-Web on Feb. 16, 2024, (9 pages).

"Notice of Allowance," for U.S. Appl. No. 18/512,651, mailed Nov. 12, 2024, (17 pages).

"Response to Non-Final Office Action,"for U.S. Appl. No. 18/502,576, filed Oct. 10, 2024 (10 pages).

"Response to Non-Final Office Action," for U.S. Appl. No. 18/512,651, filed Aug. 21, 2024 (11 pages).

"Non-Final Office Action," for U.S. Appl. No. 18/502,576 mailed Aug. 14, 2025 (19 pages).

"Response to Non-Final Office Action," for U.S. Appl. No. 18/502,576, filed Nov. 14, 2025 (13 pages).

"Final Office Action," for U.S. Appl. No. 18/502,576 mailed Jan. 2, 2025 (20 pages).

"Response to Final Office Action," for U.S. Appl. No. 18/502,576, filed Mar. 31, 2025 (13 pages).

"Corrected Notice of Allowability," for U.S. Appl. No. 18/502,576, filed on Mar. 23, 2026 (5 pages).

"Notice of Allowance," for U.S. Appl. No. 18/502,576 mailed Mar. 12, 2026 (12 pages).

Priority Table

1002

| | |
|---|---|
| Infant Crying | 1 |
| Glass Breakage | 2 |
| Request for Help | 1 |
| Door Bell | 2 |
| Alarm | 2 |
| Voices Detected | 3 |

FIG. 10

AUDIO SYSTEM WITH EAR-WORN DEVICE AND REMOTE AUDIO STREAM MANAGEMENT

This application is being filed as a PCT International Patent application on Dec. 17, 2020 in the name of Starkey Laboratories, Inc., a U.S. national corporation, applicant for the designation of all countries, and Achintya Kumar Bhowmik, a U.S. citizen, and Gregory John Haubrich, a U.S. citizen, and Paul Shriner, a U.S. citizen, inventors for the designation of all countries, and claims priority to U.S. Provisional Patent Application No. 62/949,202, filed Dec. 17, 2019, the contents of which are herein incorporated by reference in its entirety.

FIELD

Embodiments herein relate to audio systems including an ear-worn device and providing for remote audio stream management.

BACKGROUND

Many electronic devices in the modern consumer's home and work environments are capable of producing audio for presentation to and/or for use by the consumer. Audio producing devices can include, but are not limited to, entertainment devices, security devices, remote microphone devices, communication devices, and the like.

Managing multiple audio sources remains challenging. If not managed appropriately, multiple audio sources can lead to confusion and frustration for the intended audio consumer. This is particularly true when the array of possible audio sources includes audio sources that are both local and remote with respect to the consumer.

SUMMARY

Embodiments herein relate to audio systems including an ear-worn device and providing for remote audio stream management. In a first aspect, an audio system is included having an ear-worn device including a control circuit, an electroacoustic transducer in electronic communication with the control circuit, at least one microphone in electronic communication with the control circuit, and a wireless communications circuit in communication with the control circuit. The audio system can be configured to receive a notification regarding availability of a remote audio stream, query a wearer of the ear-worn device regarding the remote audio stream, receive an input from the wearer of the ear-worn device regarding the remote audio stream, selectively receive the remote audio stream, and selectively play the remote audio stream through the electroacoustic transducer.

In a second aspect, in addition to one or more of the preceding or following aspects, or in the alternative to some aspects, the notification regarding availability of a remote audio stream can be received from an accessory device.

In a third aspect, in addition to one or more of the preceding or following aspects, or in the alternative to some aspects, the accessory device is a smart phone.

In a fourth aspect, in addition to one or more of the preceding or following aspects, or in the alternative to some aspects, the remote audio stream originates from a place located remotely from the ear-worn device.

In a fifth aspect, in addition to one or more of the preceding or following aspects, or in the alternative to some aspects, the remote audio stream originates from a remote device located remotely from the ear-worn device.

In a sixth aspect, in addition to one or more of the preceding or following aspects, or in the alternative to some aspects, the remote audio stream originates from a home location of the ear-worn device wearer.

In a seventh aspect, in addition to one or more of the preceding or following aspects, or in the alternative to some aspects, the ear-worn device automatically begins to play the remote audio stream through the electroacoustic transducer when the remote audio stream originates from a designated priority location.

In an eighth aspect, in addition to one or more of the preceding or following aspects, or in the alternative to some aspects, the designated priority location is a home location of the ear-worn device wearer.

In a ninth aspect, in addition to one or more of the preceding or following aspects, or in the alternative to some aspects, the control circuit is configured to prioritize simultaneous audio streams.

In a tenth aspect, in addition to one or more of the preceding or following aspects, or in the alternative to some aspects, the control circuit is configured to prioritize simultaneous audio streams by at least one of time and auditory volume.

In an eleventh aspect, in addition to one or more of the preceding or following aspects, or in the alternative to some aspects, the ear-worn device automatically begins to play the remote audio stream through the electroacoustic transducer if the ear-worn device is streaming audio from a wireless source when the notification regarding availability of a remote audio stream is received.

In a twelfth aspect, in addition to one or more of the preceding or following aspects, or in the alternative to some aspects, the ear-worn device switches from playing a preexisting audio stream to playing the remote audio stream at a first time point, then switches back to playing the preexisting audio stream starting at a time point in the preexisting audio stream that is prior to the first time point.

In a thirteenth aspect, in addition to one or more of the preceding or following aspects, or in the alternative to some aspects, the ear-worn device switches from providing corrective audio or an ambient sound output to playing the remote audio stream at a first time point, then switches back to providing corrective audio or an ambient sound output, and announces a name of a speaker at a time of switching back to providing corrective audio or an ambient sound output.

In a fourteenth aspect, in addition to one or more of the preceding or following aspects, or in the alternative to some aspects, the remote audio stream can include a live audio feed.

In a fifteenth aspect, in addition to one or more of the preceding or following aspects, or in the alternative to some aspects, the audio system is configured to combine the remote audio stream with a corrective audio or an ambient sound output generated by the ear-worn device and then play the combination through the electroacoustic transducer.

In a sixteenth aspect, in addition to one or more of the preceding or following aspects, or in the alternative to some aspects, the audio system is configured to receive input from the ear-worn device wearer regarding a balance of output between the remote audio stream and the corrective audio or the ambient sound output.

In a seventeenth aspect, in addition to one or more of the preceding or following aspects, or in the alternative to some aspects, the audio system is configured to receive input from the ear-worn device wearer directing that a balance of output between the remote audio stream and the corrective audio or the ambient sound output changes.

In an eighteenth aspect, in addition to one or more of the preceding or following aspects, or in the alternative to some aspects, input from the ear-worn device wearer can include a button press, a swipe, a tap, a haptic input, or a gesture.

In a nineteenth aspect, in addition to one or more of the preceding or following aspects, or in the alternative to some aspects, the audio system is configured to receive input from the ear-worn device wearer such that detecting the ear-worn device wearer contacting the ear-worn device causes the corrective audio or the ambient sound output to be suspended.

In a twentieth aspect, in addition to one or more of the preceding or following aspects, or in the alternative to some aspects, the audio system is configured to mute one remote audio stream and then create another audio stream for distribution to another location.

In a twenty-first aspect, in addition to one or more of the preceding or following aspects, or in the alternative to some aspects, the audio system further can include a second ear-worn device, wherein the audio system is configured to play a different audio channel in each ear.

In a twenty-second aspect, in addition to one or more of the preceding or following aspects, or in the alternative to some aspects, the audio system plays the remote audio stream through one of the ear-worn devices and a corrective audio or an ambient sound output through the other ear-worn device.

In a twenty-third aspect, in addition to one or more of the preceding or following aspects, or in the alternative to some aspects, the audio system determines which ear to play the remote audio stream through based on an orientation of the wearer of the ear-worn device with respect to a source of the remote audio stream.

In a twenty-fourth aspect, in addition to one or more of the preceding or following aspects, or in the alternative to some aspects, the query of the device wearer is provided audibly.

In a twenty-fifth aspect, in addition to one or more of the preceding or following aspects, or in the alternative to some aspects, the query of the device wearer is provided through the accessory device.

In a twenty-sixth aspect, in addition to one or more of the preceding or following aspects, or in the alternative to some aspects, the audio system receives the input originating from the wearer of the ear-worn device regarding the remote audio stream as a voice command.

In a twenty-seventh aspect, in addition to one or more of the preceding or following aspects, or in the alternative to some aspects, the audio system receives the input originating from the wearer of the ear-worn device regarding the remote audio stream as a head, hand, or body gesture.

In a twenty-eighth aspect, in addition to one or more of the preceding or following aspects, or in the alternative to some aspects, the audio system receives the input originating from the wearer of the ear-worn device regarding the remote audio stream as a tactile input or non-tactile input.

In a twenty-ninth aspect, in addition to one or more of the preceding or following aspects, or in the alternative to some aspects, the tactile input can include a tap or a button press.

In a thirtieth aspect, in addition to one or more of the preceding or following aspects, or in the alternative to some aspects, the audio system is further configured to receive audio input via the at least one microphone and send the audio input to an accessory device.

In a thirty-first aspect, in addition to one or more of the preceding or following aspects, or in the alternative to some aspects, the audio system is further configured to receive audio input via the at least one microphone and send the audio input to a remote device.

In a thirty-second aspect, in addition to one or more of the preceding or following aspects, or in the alternative to some aspects, the audio system is further configured to send a preconfigured audio message to an accessory device.

In a thirty-third aspect, in addition to one or more of the preceding or following aspects, or in the alternative to some aspects, the audio system is further configured to send a preconfigured audio message to a remote device.

In a thirty-fourth aspect, in addition to one or more of the preceding or following aspects, or in the alternative to some aspects, the audio system is configured to classify the notification regarding availability of a remote audio stream and initiate receipt of the remote audio stream based on the classification.

In a thirty-fifth aspect, in addition to one or more of the preceding or following aspects, or in the alternative to some aspects, the accessory device acts as a gatekeeper device.

In a thirty-sixth aspect, in addition to one or more of the preceding or following aspects, or in the alternative to some aspects, the audio system is configured to classify the notification regarding availability of a remote audio stream for possible third-party conveyance and convey the remote audio stream to a third-party device if so classified.

In a thirty-seventh aspect, in addition to one or more of the preceding or following aspects, or in the alternative to some aspects, the remote device includes a home or automobile security system.

In a thirty-eighth aspect, in addition to one or more of the preceding or following aspects, or in the alternative to some aspects, the notification regarding availability of the remote audio stream is initiated by a trigger event sensed by a remote device.

In a thirty-ninth aspect, in addition to one or more of the preceding or following aspects, or in the alternative to some aspects, the trigger event can include at least one selected from the group consisting of an infant crying, glass breakage, a request for help, a sound exceeding a threshold volume, running water, and an alarm.

In a fortieth aspect, in addition to one or more of the preceding or following aspects, or in the alternative to some aspects, the trigger event can include sound indicative of emotional stress exceeding a threshold value.

In a forty-first aspect, in addition to one or more of the preceding or following aspects, or in the alternative to some aspects, the remote device includes at least one selected from the group consisting of a security system, a child monitor, a smart home device, and a remote microphone.

In a forty-second aspect, in addition to one or more of the preceding or following aspects, or in the alternative to some aspects, the system further can include an accessory device, wherein the remote audio stream is accompanied by a remote video stream, wherein the remote video stream is played through the accessory device.

In a forty-third aspect, a method of operating an audio system is included. The method can include receiving a notification regarding availability of a remote audio stream, querying a wearer of an ear-worn device regarding the remote audio stream, receiving an input from the wearer of the ear-worn device regarding the remote audio stream, selectively receiving the remote audio stream, and selectively playing the remote audio stream through an electroacoustic transducer.

In a forty-fourth aspect, in addition to one or more of the preceding or following aspects, or in the alternative to some aspects, the method further can include automatically beginning to play the remote audio stream through the electroacoustic transducer when the remote audio stream originates from a home location of the ear-worn device wearer.

In a forty-fifth aspect, in addition to one or more of the preceding or following aspects, or in the alternative to some aspects, the method further can include automatically beginning to play the remote audio stream through the electroacoustic transducer if the ear-worn device is streaming audio from a wireless source when the notification regarding availability of a remote audio stream is received.

In a forty-sixth aspect, in addition to one or more of the preceding or following aspects, or in the alternative to some aspects, the method further can include combining the remote audio stream with a hearing assistance audio output generated the ear-worn device and then playing the combination through the electroacoustic transducer.

In a forty-seventh aspect, in addition to one or more of the preceding or following aspects, or in the alternative to some aspects, the method further can include receiving input from the ear-worn device wearer regarding a balance of output between the remote audio stream and a hearing assistance audio output.

In a forty-eighth aspect, in addition to one or more of the preceding or following aspects, or in the alternative to some aspects, the method further can include receiving input from the ear-worn device wearer such that detecting the ear-worn device wearer contacting the ear-worn device causes a balance of output between the remote audio stream and a hearing assistance audio output to change.

In a forty-ninth aspect, in addition to one or more of the preceding or following aspects, or in the alternative to some aspects, the method further can include receiving input from the ear-worn device wearer such that detecting the ear-worn device wearer contacting the ear-worn device causes a hearing assistance audio output to be suspended.

In a fiftieth aspect, in addition to one or more of the preceding or following aspects, or in the alternative to some aspects, the method further can include receiving the input originating from the wearer of the ear-worn device regarding the remote audio stream as a voice command.

In a fifty-first aspect, in addition to one or more of the preceding or following aspects, or in the alternative to some aspects, the method further can include receiving the input originating from the wearer of the ear-worn device regarding the remote audio stream as a head gesture.

In a fifty-second aspect, in addition to one or more of the preceding or following aspects, or in the alternative to some aspects, the method further can include receiving the input originating from the wearer of the ear-worn device regarding the remote audio stream as a tactile input.

In a fifty-third aspect, in addition to one or more of the preceding or following aspects, or in the alternative to some aspects, the method further can include receiving audio input from a microphone and sending the audio input to an accessory device.

In a fifty-fourth aspect, in addition to one or more of the preceding or following aspects, or in the alternative to some aspects, the method further can include receiving audio input from a microphone and sending the audio input to a remote device.

In a fifty-fifth aspect, in addition to one or more of the preceding or following aspects, or in the alternative to some aspects, the method further can include classifying the notification and initiating receipt of the remote audio stream based on the classification.

In a fifty-sixth aspect, in addition to one or more of the preceding or following aspects, or in the alternative to some aspects, the method further can include classifying the notification for third-party conveyance and conveying the remote audio stream to a third-party.

In a fifty-seventh aspect, a method of operating an audio system is included. The method can include receiving a notification regarding availability of a remote audio stream, evaluating a priority level of the remote audio stream, querying a wearer of an ear-worn device regarding the remote audio stream if the priority level exceeds a threshold priority value, receiving an input from the wearer of the ear-worn device regarding the remote audio stream, selectively receiving the remote audio stream, and selectively playing the remote audio stream through an electroacoustic transducer.

In a fifty-eighth aspect, in addition to one or more of the preceding or following aspects, or in the alternative to some aspects, the threshold priority value is a priority level of an existing audio stream.

In a fifty-ninth aspect, in addition to one or more of the preceding or following aspects, or in the alternative to some aspects, the threshold priority value is preset.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which:

FIG. 10 is a schematic view of a priority table in accordance with various embodiments herein.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

As discussed above, many devices in the modern consumer's home and work environments are capable of producing audio for presentation to or use by the consumer. Unfortunately, managing multiple audio sources remains challenging. If not managed appropriately, multiple audio sources can lead to confusion and frustration for the intended audio consumer. This is particularly true when the array of possible audio sources includes audio sources that are both local and remote with respect to the consumer.

However, in accordance with embodiments herein, an audio system can manage multiple audio streams (or channels) and present them to a device wearer in a manner allowing for control by the device wearer and avoiding confusion and frustration. Further, various embodiments of audio systems herein can receive remote audio streams (audio streams originating from a remote location) and manage them along with other local audio streams (or channels) allowing a device wearer to seamlessly receive remote audio streams and the information therewith in a manner that can provide the device wearer with the experience of being in multiple locations at the same time.

Figure 1:
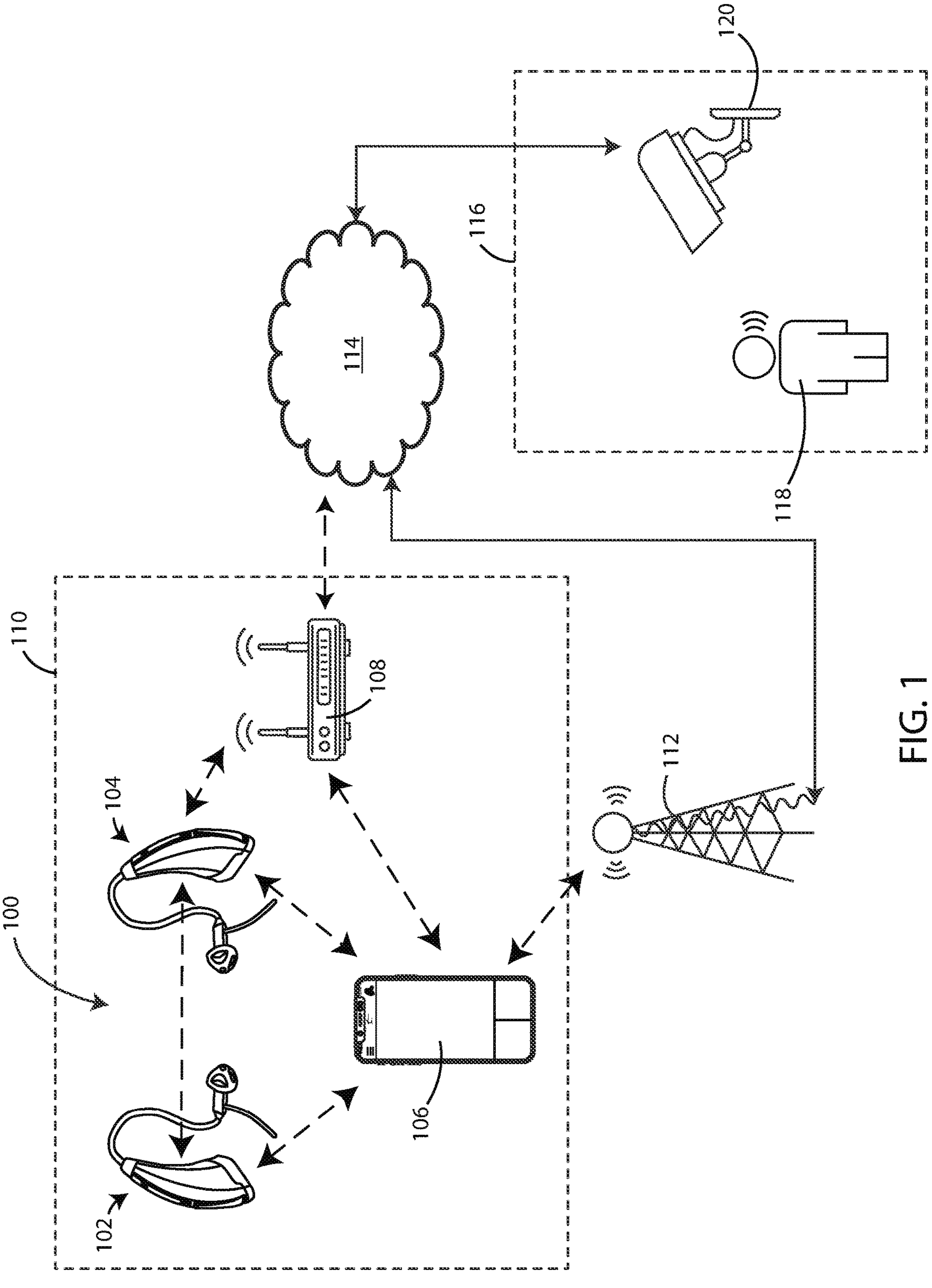
FIG. 1 is a schematic view of an audio system with an ear-worn device in accordance with various embodiments herein.

Referring now to FIG. 1, a schematic view of an audio system 100 with an ear-worn device is shown in accordance with various embodiments herein. The audio system 100 includes a first ear-worn device 102 and a second ear-worn device 104. The ear-worn devices can interface with an accessory device 106, which can be part of the audio system 100. In some cases, the accessory device 106 can be a smart phone, an IoT hub, smart home device, personal communications device, or the like. However, the accessory device 106 can also be another type of device. In various embodiments the accessory device 106 or other stream source can disable itself as an audio source or mute itself such as for purposes of privacy or other reasons.

FIG. 1 shows a current location 110 (e.g., reflecting the current location of the ear-worn device(s)) and second location 116, which could be a remote location, such as a home location when a device wearer is away from home. For purposes of illustration, FIG. 1 shows a visitor 118 and a security system 120 at the second location 116. The security system 120 (which could be a home or automobile security system, amongst others) can serve as one example of a remote device that can create a remote audio stream for consumption by the device wearer. Other remote devices can include entertainment devices, security devices, remote microphone devices, and communication devices, amongst others. In various embodiments, the remote device can specifically include at least one of a security system, a child monitor, a smart home device, and a remote microphone.

FIG. 1 also shows various data communication equipment such as a router 108 and a cellular communications tower 112, which can be used to convey data including audio streams to or from the ear-worn devices 102, 104 and the accessory device 106. Data communication equipment can be used to provide connectivity with a data communication network 114. However, it will be appreciated that various other pieces of data communication equipment can be used to convey audio streams and/or commands or other information in accordance with embodiments herein.

In various embodiments, the audio system 100 can be configured to receive a remote audio stream, such as an audio stream originating with the security system 120 (or another device) at the second location 116 (or remote location). In various embodiments, the audio system 100 can be configured to play the remote audio stream through the ear-worn devices 102, 104 for an ear-worn device wearer.

In various embodiments, the audio system 100 switches from playing a preexisting audio stream or normal hearing assistance audio output to playing the remote audio stream. However, in various embodiments, prior to switching the audio system 100 can query the device wearer.

Input from a device wearer (such as in response to a query or to provide a command) can be received in various way. In some embodiments, the audio system 100 can be configured to receive input from the ear-worn device 102 wearer such that detecting the ear-worn device 102 wearer contacting the ear-worn device 102 causes a normal hearing assistance audio output to be suspended in favor of receiving a remote audio stream. In various embodiments, the audio system 100 receives the input originating from the wearer of the ear-worn device 102 regarding the remote audio stream from the accessory device 106 as a voice command. In various embodiments, the audio system 100 receives the input originating from the wearer of the ear-worn device 102 regarding the remote audio stream from the accessory device 106 as a head gesture. In various embodiments, the audio system 100 receives the input originating from the wearer of the ear-worn device 102 regarding the remote audio stream from the accessory device 106 as a tactile input or non-tactile input.

While many scenarios include querying the device wearer before playing other audio streams, in some cases, the audio system 100 can be configured to automatically play certain audio streams (such as remote audio streams) for the device wearer, such as without querying the device wearer first. For example, in various embodiments, the ear-worn device 102 automatically begins to play the remote audio stream through the electroacoustic transducer when the remote audio stream originates from a designated priority location. In various embodiments, the ear-worn device 102 automatically begins to play the remote audio stream through the electroacoustic transducer if the ear-worn device 102 is streaming audio from a certain type of audio source (such as a wireless music source) when the notification regarding availability of a remote audio stream is received.

In some cases, it may be desirable to mix audio channels instead of completely switching from one to another. In various embodiments, the audio system 100 can be configured to combine a remote audio stream with a hearing assistance audio output generated by the ear-worn device 102 and then play the combination through the ear-worn devices 102, 104 (such as through an electroacoustic transducer thereof). In various embodiments, the audio system 100 can be configured to receive input from the ear-worn device 102 wearer regarding the combination, such as regarding a balance of output between the remote audio stream and the hearing assistance audio output. In various embodiments, the audio system 100 can be configured to receive input from the ear-worn device 102 wearer directing that a balance of output between the remote audio stream and the hearing assistance audio output changes.

Mixing of audio channels can be performed in various ways. In some cases, audio channels can effectively be superposed onto one another. In some cases, audio channels can be separately processed for amplification, sample rate accommodation, noise attenuation, sound field effects, or the like before being added to one another. In some embodiments, mixing can be performed via a digital signal processing (DSP) circuit or chip or an audio processing chip. In some embodiments, mixing can be performed via an analog circuit. In one simple approach, amplification (gain) of each input channel can be independently controlled with a potentiometer placed at the inverting input of an operational amplifier for each channel configured as an inverting amplifier with decoupling capacitors at its input and output, with outputs being added together. Details regarding techniques for mixing of audio streams are described in U.S. Pat. Nos. 6,230,130; 9,136,881; and U.S. Publ. Appl. No. 2006/0023900, the content of which is herein incorporated by reference.

Audio streams herein can include both digital and analog audio streams. In various embodiments herein, digital audio streams can be processed/encoded/decoded according to various different audio codecs including, but not limited to, AAC, ALAC, AMR, FLAC, G.711, G.722, MP3, Opus, Vorbis, LC3, SBC, and the like. In various embodiments, audio streams herein can represent audio with various sampling rates/sample sizes/frequency bandwidths/bit depth/bit rates, etc. In some embodiments, the sample rate can be about 11.025 kHz, 22.05 kHz, 44.1 kHz, 48 kHz, 96 kHz, or higher, or an amount falling within a range between any of the foregoing. In various embodiments, the bit rate can be about 8, 16, 32, 64, 96, 128 kbps or more, or an amount falling within a range between any of the foregoing. As a specific example, an audio stream herein can include a bit rate of 96 kbps at a 48 kHz sample rate or the equivalent thereof.

In some cases, audio streams can also originate with the device wearer and/or components of the audio system 100 and then pass to a remote location. In other words, in some embodiments, audio streams can pass in both directions (to and from) with regard to a remote location. For example, in various embodiments, the audio system 100 can be configured to mute one remote audio stream and then create another audio stream for distribution to another location. In various embodiments, the audio system 100 can be further configured to receive audio input via the a microphone and send the audio input back to a remote location and/or a remote device at the remote location. In various embodiments, the audio system 100 can be further configured to send a preconfigured audio message (e.g., “Are you okay?”, “I’ll call later.”, etc.) back to a remote location and/or a remote device at the remote location. In some cases, the remote location and/or remote device at the remote location can be configured to send a preconfigured audio message to the audio system 100. Thus, in some embodiments, the preconfigured audio messages can be two-way.

Various ear-worn devices herein are capable of providing a hearing assistance audio output to the device wearer. For example, some ear-worn devices herein can be hearing assistance devices or hearing aids and can provide the device wearer with an audio output that reflects audio signals originating with microphones (or similar devices) associated with the ear-worn device that is then processed (using techniques including one or more of amplification, frequency specific amplification, frequency shifting, frequency compression, frequency transposition, noise cancelation, and the like) in order to provide a hearing assistance audio output to the device wearer to correct for hearing deficiencies that the device wearer might have. While the hearing assistance audio output may not qualify as an audio “stream” depending on the definition applied, it will be appreciated herein that hearing assistance audio outputs can still be managed along with various audio streams through techniques described herein as they were an audio stream including, for example, switching away from and/or switching to hearing assistance audio outputs and mixing hearing assistance audio outputs with various other audio streams.

In various embodiments, one or more audio streams or channels can specifically be a remote audio stream or channel, though it will be appreciated that local audio streams are also included herein. In various embodiments, the remote audio stream originates from a place located remotely from the ear-worn device 102. In various embodiments, the remote audio stream can be from another room or another building or another place. In various embodiments, the remote audio stream can originate from a location that is at least about 20, 30, 40, 50, 100, 200, 500, 750, 1000, 5000, 10000 feet away or more. In various embodiments, the remote audio stream can originate from a location that is outside of the normal audible range of the present location. In various embodiments, the remote audio stream originates from a home location of the ear-worn device 102 wearer. In various embodiments, the remote audio stream originates from a work location of the ear-worn device 102 wearer. In various embodiments, the remote audio stream originates from a vehicle.

In various embodiments, the remote audio stream can include a live audio feed. As used herein, the term “live audio feed” can include an audio feed that is delayed by less than about 10, 8, 5, 4, 3, 2, or 1 seconds, or an amount of time falling within a range between any of the foregoing.

Figure 2:
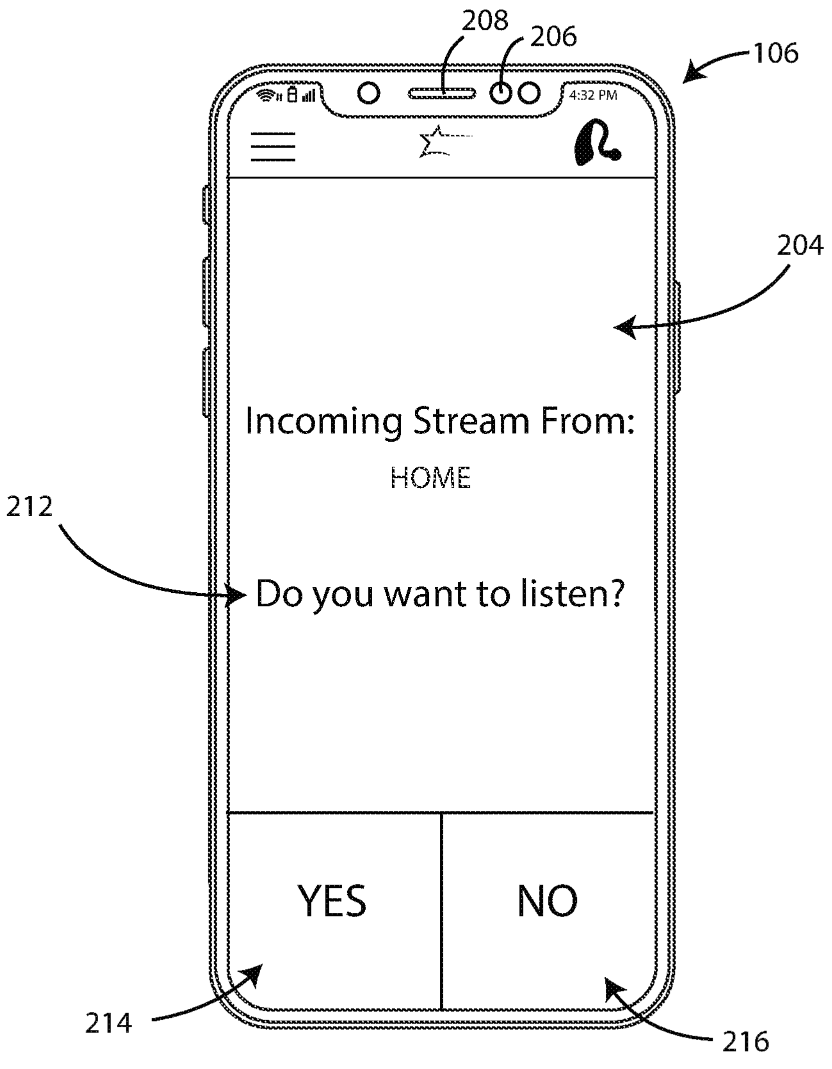
FIG. 2 is a schematic view of an accessory device in accordance with various embodiments herein.

Referring now to FIG. 2, a schematic view of an accessory device 106 is shown in accordance with various embodiments herein. The accessory device 106 can include a screen 204. The accessory device 106 can also include a camera 206. The accessory device 106 can also include a speaker 208.

The accessory device 106 can be used to query the device wearer visually, audibly, and/or haptically. For example, the accessory device 106 can be configured to display a query 212 for a device wearer. In various embodiments, the query 212 of the device wearer is provided audibly. In various embodiments, the query 212 of the device wearer (described further below) is provided through a separate external accessory device. The content of the query can include many things. In some embodiments, the query can include whether or not the device wearer wants to listen to an available audio stream.

The accessory device 106 can also receive input from the device wearer, audibly, through physical interaction, or by the use of gestures. For example, the accessory device 106 can include a first response button 214. The accessory device 106 can also include a second response button 216. In various embodiments, the audio system 100 receives the input originating from the wearer of the ear-worn device 102 regarding the remote audio stream from the accessory device 106 as a voice command or a sub-vocalized sound such as a tongue click. In various embodiments, the audio system 100 receives the input originating from the wearer of the ear-worn device 102 regarding the remote audio stream from the accessory device 106 as a head, hand, or body gesture.

In various embodiments, the audio system 100 receives the input originating from the wearer of the ear-worn device 102 regarding the remote audio stream from the accessory device 106 as a tactile input or non-tactile input. In various embodiments, the tactile input can include a tap, swipe, or a button press.

In various embodiments, a remote audio stream can be accompanied by a remote video stream. In some embodiments, the remote video stream can be played through the accessory device 106, such as being shown on a screen 204 thereof. For example, in the case where the remote device producing the remote audio stream is a security system, a remote video stream (such as generated using a video camera of the security system) can accompany the remote audio stream.

Figure 3:
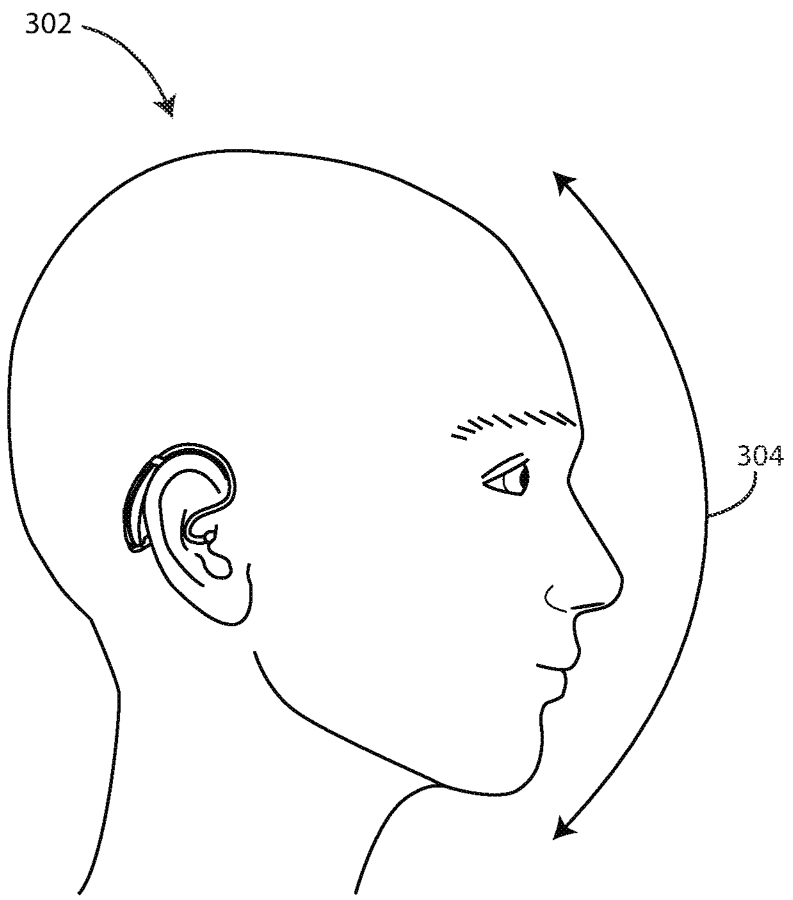
FIG. 3 is a schematic view of a person wearing an ear-worn device in accordance with various embodiments herein.

Referring now to FIG. 3, a schematic view of a person wearing an ear-worn device 102 (e.g., device wearer 302) is shown in accordance with various embodiments herein. The audio system can be configured to receive inputs or other feedback from the device wearer 302. For example, audio system can be configured to receive a gesture 304 (such as a head nod) as an input. In some embodiments, inputs from the device wearer 302 can be received/detected by the accessory device 106. In some embodiments, inputs from the device wearer 302 can be received/detected by one or more sensors associated with the ear-worn device(s) 102, 104. Exemplary sensors are described in greater detail below. For example, a head nod can be detected by evaluating the signal from an IMU or other motion sensor.

Figure 4:
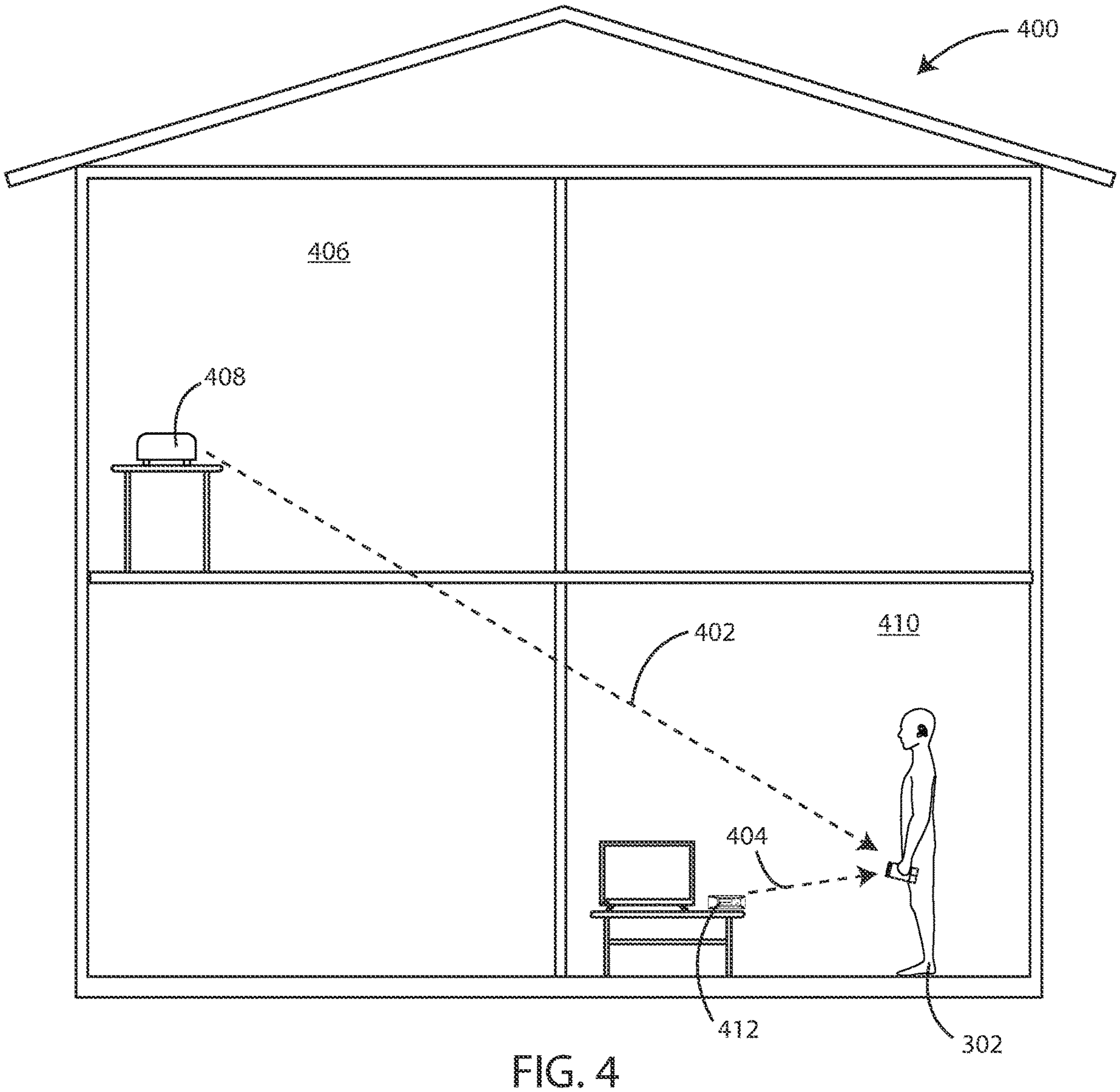
FIG. 4 is a schematic view of a person wearing an ear-worn device and receiving a remote audio stream in accordance with various embodiments herein.

Referring now to FIG. 4, a schematic view of a person (device wearer 302) wearing an ear-worn device 102 and receiving a remote audio stream is shown in accordance with various embodiments herein. FIG. 4 illustrates the scenario where the device wearer 302 may be within a house 400 or other structure. In this example, the house 400 includes a first room 406 and a second room 410, and the device wearer 302 is within the second room 410. A first audio stream 402 may originate with a remote device 408 (or first audio stream producing device) in the first room 406. A second audio stream 404 may originate with a local device 412 (or second audio stream producing device) in the second room 410. In this example, the second room 410 is out of normal audible range of the first room 406 and therefor is remote for purposes herein.

In various embodiments, a notification regarding the availability of a remote audio stream (such as from the remote device 408) may be received by the system. The notification may pass through various wired or wireless communication protocols including, but not limited to, BLUETOOTH, BLE, WIFI, ZigBee, Z-Wave, 6LoWPAN, Thread, 2G, 3G, 4G, 5G, LTE, and the like. In many cases, this notification can be received by an accessory device, but in some cases can be directly received by an ear-worn device. Wherein the notification is received by an accessory device, it can serve as a gatekeeper. For example, battery capacity associated with the ear-worn devices may be more limited that than of the accessory device. As such, using the accessory device as a gatekeeper and, for example, querying the device wearer using the accessory device can be useful for preserving the battery life of the ear-worn device(s). In some embodiments, the accessory device can serve as a gatekeeper device by evaluating credentials associated with any notifications or other data/packets received in order to assure authentication of the same.

In various embodiments, a notification regarding availability of a remote audio stream is initiated by a trigger event sensed by the remote device 408. In various embodiments, the trigger event can include at least one including at least one of an infant crying, glass breakage, a request for help, a sound exceeding a threshold volume, running water, and an alarm. In some embodiments, the threshold volume of sound can be greater than or equal to 40, 45, 50, 55, 60, 65, 70, 75, 80, 85, 90, 95, 100, 105, 110, 115, or 120 dB SPL, or can be an amount falling within a range between any of the foregoing. In various embodiments, the trigger event can include sound indicative of stress exceeding a threshold value.

In various embodiments, the notification regarding availability of a remote audio stream is classified by the audio system 100 for third-party conveyance and conveys the remote audio stream to a third-party device. For example, certain types of sounds, such as one or more of an infant crying, glass breakage, a request for help, a sound exceeding a threshold volume, running water, or an alarm, may be preconfigured to be automatically sent (or forwarded) to a designated third-party. In one example, detection of sound consistent with an infant crying can be classified for third-party conveyance and then an audio stream originating from the location of the infant can be automatically conveyed onto the third-party, such as a designated care provider.

Figure 5:
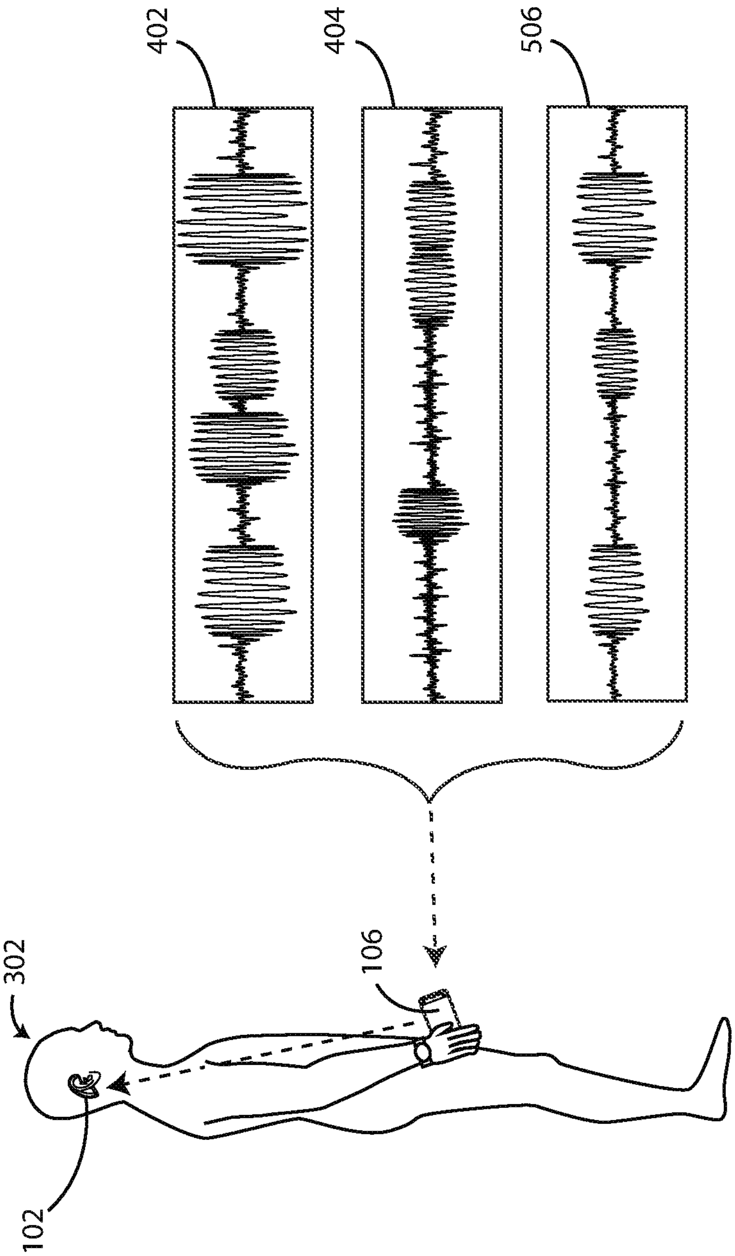
FIG. 5 is a schematic view of a person wearing an ear-worn device and receiving a remote audio stream in accordance with various embodiments herein.

It will be appreciated that the number of audio streams that an audio system receives and/or receives notifications about is not particularly limited. For example, an audio system herein may receive notifications regarding 1, 2, 3, 4, 5, 6, 7, 8, 9, 10, or more audio streams, or an amount falling within a range between any of the foregoing. Referring now to FIG. 5, a schematic view of a person (device wearer 302) wearing an ear-worn device 102 and receiving a remote audio stream is shown in accordance with various embodiments herein. The device wearer 302 also has an accessory device 106 in this view. In this case, three separate audio streams may be available for the audio system to handle. In specific, FIG. 5 shows a first audio stream 402, a second audio stream 404, and a third audio stream 506.

There are many different ways in which the multiple audio streams can be handled including switching between different audio streams and/or mixing two or more audio streams. In various embodiments, the audio system 100 is configured to combine the remote audio stream with a hearing assistance audio output generated by the ear-worn device 102 and then play the combination through the electroacoustic transducer. In various embodiments, the audio system 100 is configured to receive input from the ear-worn device 102 wearer regarding a balance of output between the remote audio stream and the hearing assistance audio output. In various embodiments, the audio system 100 is configured to receive input from the ear-worn device 102 wearer directing that a balance of output between the remote audio stream and the hearing assistance audio output changes. In various embodiments, the audio system 100 is configured to receive input from the ear-worn device 102 wearer such that detecting the ear-worn device 102 wearer contacting the ear-worn device 102 causes playback of an audio stream to be suspended.

Figure 6:
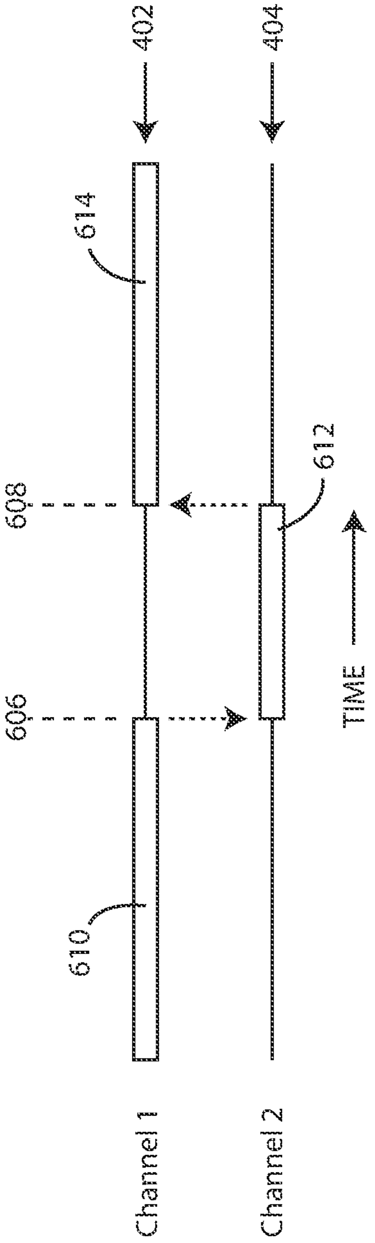
FIG. 6 is a schematic view of switching between audio streams in accordance with various embodiments herein.

Referring now to FIG. 6, a schematic view is shown of an approach herein including switching between audio streams. Specifically, FIG. 6 shows a first audio stream 402 and a second audio stream 404, and operations for switching between the two. Prior to a first time point 606, the system can play a first segment 610 of the first audio stream 402. At the first time point 606, then the system can switch so that the system plays a second segment 612 from the second audio stream 404. At the second time point 608, the system can switch again so that the system plays a third segment 614 from the first audio stream 402.

The second segment 612 can have various lengths and is not particularly limited. In some embodiments, the length can be greater than or equal to 5, 25, 45, 65, 85, 105, 125, 145, 165, 185, 205, 225, 245, 265, 285, 305, 325, 345, or 360 seconds, or can be an amount falling within a range between any of the foregoing.

Thus, in various embodiments, the ear-worn device 102 switches from playing a preexisting audio stream (which can be the first audio stream 402) to playing the remote audio stream (which can be the second audio stream 404) at the first time point 606. Then, at the second time point 608, the ear-worn device 102 can switch back to the previous audio stream. In various embodiments, the ear-worn device 102 switches from a corrective audio output or an ambient sound output (which can be the first audio stream 402) to playing the remote audio stream (which can be the second audio stream 404) at the first time point 606. Ambient sound outputs can be provided in amplified, attenuated, normal no-gain, or dynamic modes. The corrective audio output can be, for example, the type of audio provided by a hearing aid or hearing assistance device in order to assist the device wearer with hearing deficits.

In some cases, when the ear-worn device 102 or audio system 100 switches back to the first audio stream 402 it can start where it left off, such as might be the case with a non-live audio stream that can simply be "paused". In other cases, such as with a live audio stream, when the ear-worn device 102 or audio system 100 switches back to the first audio stream 402 it can start at the point where the live audio stream has gotten to in real time while the ear-worn device 102 or audio system 100 was playing the second audio stream 404. In some cases, a formerly live audio stream can be converted to a non-live or delayed audio stream when the ear-worn device 102 or audio system 100 switches back to the first audio stream 402. In some cases, a formerly live audio stream can be played at faster speeds (with or without frequency band shifting) when it is switched back to in order to catch up to the live audio.

In switching between streams, it can be useful for a device wearer to receive some information about the stream before they switch to it. Also, in switching between streams, sometimes a device wearer may forget certain details about a given audio stream before they switch back to it. In various embodiments herein, the system can play a context segment which is not directly a part of the audio stream but provides some information or context about the audio stream. The context segment can include various pieces of information including, but not limited to, the name of the location and/or device that is the source of the audio stream, the name(s) of one or more individuals who are speaking via the audio stream, whether the audio stream is live or prerecorded, and the like. By providing a context segment, device wearer confusion can be reduced. In various embodiments, the context segment can cause a delay of the audio stream sufficient so that the context segment can be heard without missing a portion of the audio stream.

Figure 7:
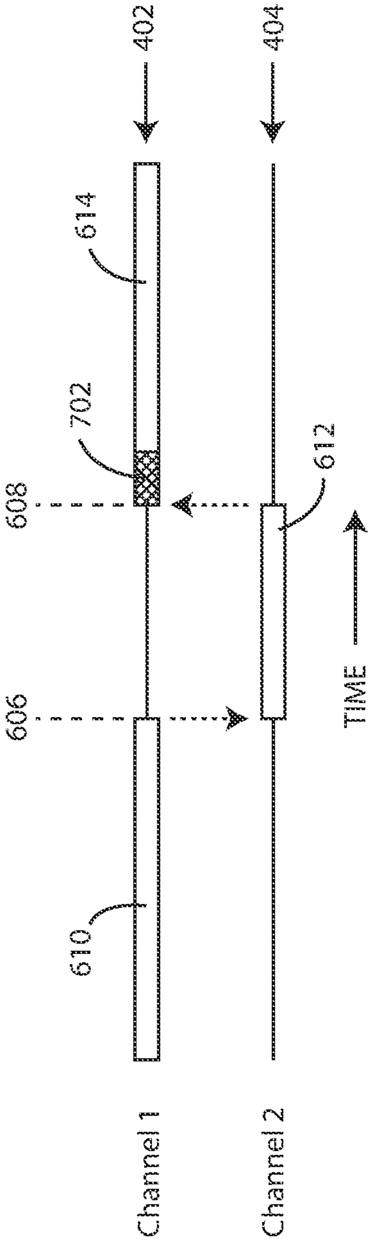
FIG. 7 is a schematic view of switching between audio streams in accordance with various embodiments herein.

Referring now to FIG. 7, a schematic view of switching between audio streams is shown in accordance with various embodiments herein. FIG. 7 shows a first audio stream 402 and a second audio stream 404 and illustrates operations for switching between the two. Prior to a first time point 606, the system can play a first segment 610 of the first audio stream 402. At the first time point 606, then the system can switch so that the system plays a second segment 612 from the second audio stream 404. At the second time point 608, the system can switch back to the first audio stream 402. However, before playing the third segment 614 from the first audio stream 402, the system can play a context segment 702.

The context segment 702 can be audio that provides information/context to the device wearer such that the transition back to the first audio stream 402 is not too confusing/abrupt. In some embodiments, the name of a person who is speaking can be stored in the system or derived through voice analysis. Then, in various embodiments, the ear-worn device 102 switches from providing corrective audio to playing the remote audio stream at a first time point 606, then switches back to the first audio stream (which could be corrective audio output from the ear-worn device) and announces the name of a speaker at a time of switching back to providing corrective audio.

Figure 8:
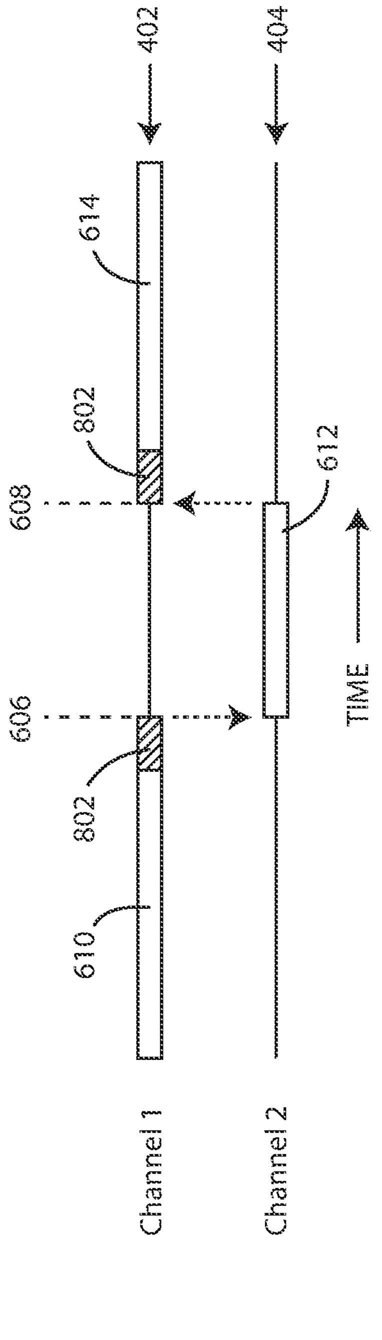
FIG. 8 is a schematic view of switching between audio streams in accordance with various embodiments herein.

In some embodiments, one or more portions of an audio stream can be replayed when the user switches back to them. Referring now to FIG. 8, a schematic view of switching between audio streams is shown in accordance with various embodiments herein. FIG. 8 shows a first audio stream 402 and a second audio stream 404 and illustrates operations for switching between the two. Prior to a first time point 606, the system can play a first segment 610 of the first audio stream 402. At the first time point 606, then the system can switch so that the system plays a second segment 612 from the second audio stream 404. At the second time point 608, the system can switch back to the first audio stream 402. However, before playing the third segment 614 from the first audio stream 402, the system can play a repeated segment 802. For example, in various embodiments, the ear-worn device 102 switches from playing a preexisting audio stream to playing the remote audio stream at a first time point 606, then switches back to playing the preexisting audio stream starting at a time point in the preexisting audio stream that is prior to the first time point 606.

The repeated segment 802 can have a length of various dimensions. In some embodiments, the length can be greater than or equal to 1, 3, 5, 6, 8, or 10 seconds. In some embodiments, the length can be less than or equal to 30, 26, 22, 18, 14, or 10 seconds. In some embodiments, the length can fall within a range of 1 to 30 seconds, or 3 to 26 seconds, or 5 to 22 seconds, or 6 to 18 seconds, or 8 to 14 seconds, or can be about 10 seconds.

As referenced above, instead of switching between audio streams, in some embodiments audio streams can be mixed. In still other embodiments, audio streams can be split up such that the left and right ear-worn devices of systems herein provide separate audio to the device wearer. Thus, in various embodiments, the audio system 100 can be configured to play a different audio channel in each ear. In various embodiments, the audio system 100 can be configured to play a different mixed audio channel in each ear.

Figure 9:
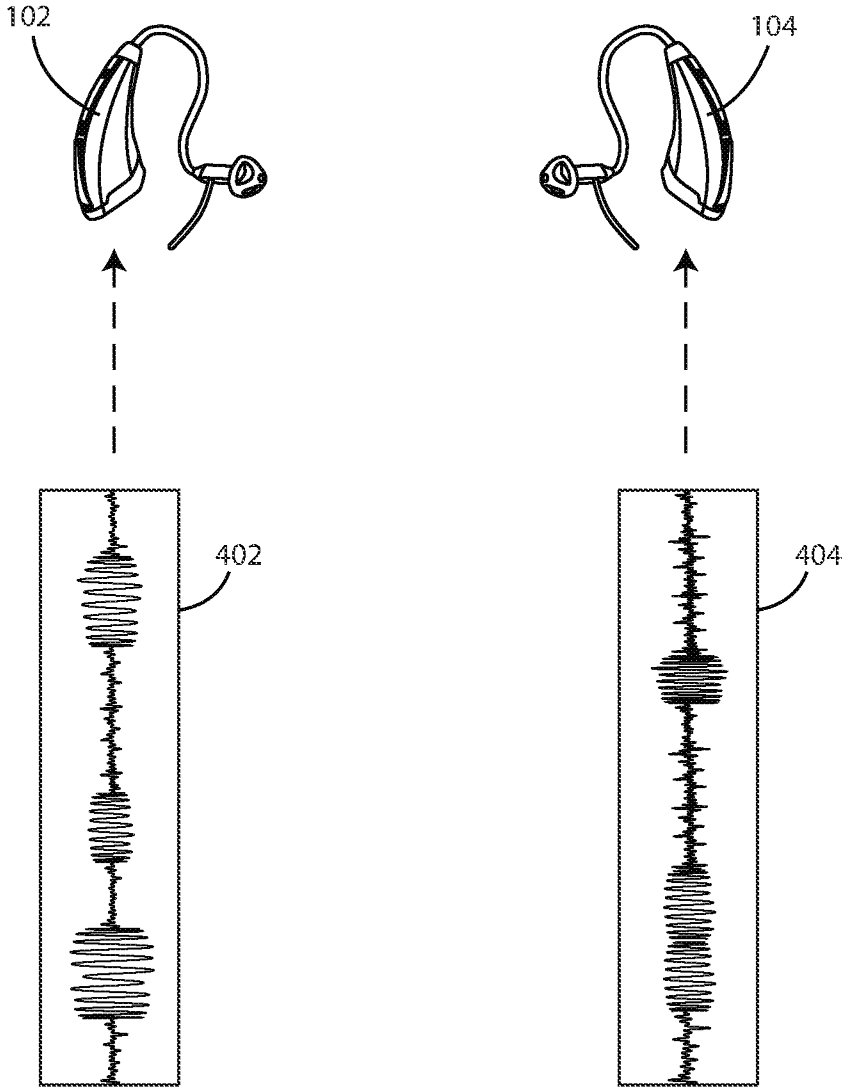
FIG. 9 is a schematic view of two audio streams being received by a pair of ear-worn devices in accordance with various embodiments herein.

Referring now to FIG. 9, a schematic view of two audio streams being received by a pair of ear-worn devices is shown in accordance with various embodiments herein. The first ear-worn device 102 is receiving a first audio stream 402. The second ear-worn device 104 is receiving a second audio stream 404. By way of example, the audio system 100 may be playing a remote audio stream through one of the ear-worn devices and a normal assistive audio output through the other ear-worn device.

In some embodiments, the audio system 100 determines which ear to play the remote audio stream through based on an orientation of the wearer of the ear-worn device with respect to a source of the remote audio stream. For example, if the source of a remote audio stream is located to the right side of a device wearer, then the remote audio stream can be provided through an ear-worn device on the right side. Conversely, if the source of a remote audio stream is located to the left side of a device wearer, then the remote audio stream can be provided through an ear-worn device on the left side. As the device wearer moves their head, and as sensed through the use of sensors herein, such as those forming part of an IMU or motion sensor, the directionality of the played audio can switch or be mixed appropriately. In some cases, the direction of the source of the remote audio stream can be established via geolocation data. In some cases, the direction of the source of the remote audio stream can be arbitrarily set as the direction that the device wearer is facing when they first accept receipt of the remote audio stream.

In some embodiments, the audio system 100 determines which ear to play the remote audio stream through based on a predetermined configuration. For example, the audio system 100 can be configured to always play audio streams that have a remote origin through the left side or the right side. In some embodiments, the audio system 100 determines which ear to play the remote audio stream through based on the priority status of the of the audio stream.

In some embodiments, the audio system 100 and/or ear-worn device 102 automatically begins to play the remote audio stream for the device wearer through the electroacoustic transducer when the remote audio stream originates from a designated priority location. By way of example, a designated priority location can be a home location of the ear-worn device 102 wearer. In some embodiments, the notification regarding availability of a remote audio stream can be received by an accessory device which classifies the notification and initiates receipt of the remote audio stream based on the classification.

Priority locations may be stored in the system. Referring now to FIG. 10, a schematic view of a priority table 1002 is shown in accordance with various embodiments herein. In this example, lower numbers have higher priority (e.g., "1" having a higher priority than "2"), however it will be appreciated that priority can be designated in various ways. In some embodiments, the control circuit is configured to prioritize simultaneous audio streams, such as by using entries in a priority table 1002. Prioritization can take various forms. For example, in some embodiments, if multiple remote audio streams are available, the device wearer will only be presented with a notification regarding the audio stream having the highest priority. In some embodiments, if a device is already listening to a stream having a given priority, a notification of another available stream will only be provided if it has a priority equal to or greater than the existing audio stream being listened to. In some cases, a notification of another available stream will only be provided if it has a priority value exceeding a threshold value. In some embodiments, a lower priority stream can be put on "hold" until a higher priority stream is completed. In some embodiments, such as in the case of mixing of audio channels, the highest priority audio stream will be played for the device wearer at the highest volume. In various embodiments, the control circuit is configured to prioritize simultaneous audio streams by at least one of time and auditory volume. Priority schemes herein can be user configurable and/or can have time dependence.

Figure 11:
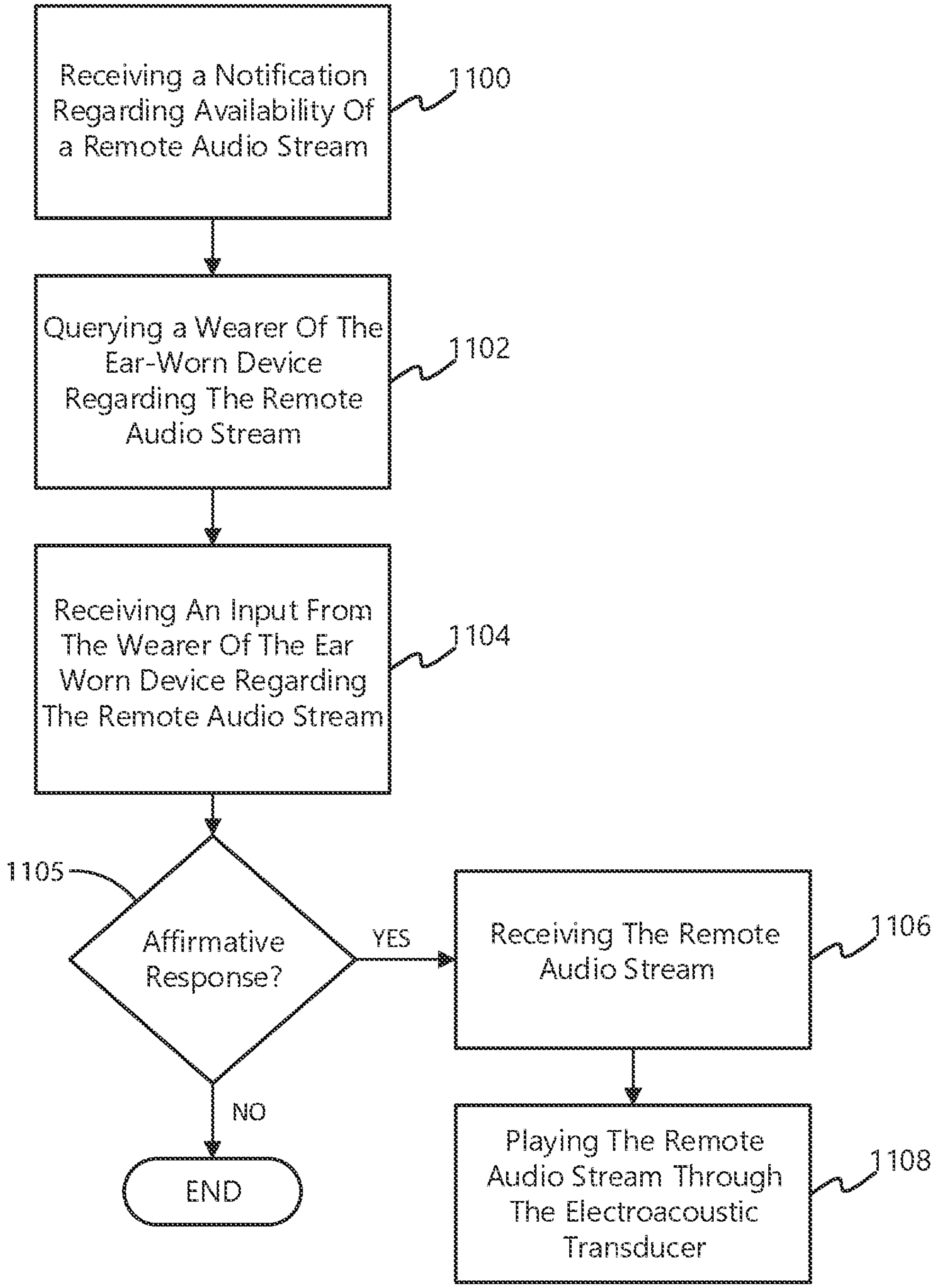
FIG. 11 is a schematic view of operations taken by an audio system in accordance with various embodiments herein.

Referring now to FIG. 11, a schematic view of operations taken by an audio system 100 is shown in accordance with various embodiments herein. The system can execute an operation of receiving 1100 a notification regarding availability of a remote audio stream. The system can also execute an operation of querying 1102 a wearer of an ear-worn device regarding the remote audio stream.

The system can also execute an operation of receiving 1104 an input from the wearer of the ear-worn device regarding the remote audio stream. The inputs can vary and can include a response to begin playing the audio stream, a response to decline the audio stream, a response to put the audio stream on hold (such as to allow the user to wrap up what they are doing before receiving the audio stream), a response to send a message to the source but not start playing the audio stream, and the like. Then the system can execute an operation accordingly. For example, the system can execute an operation of selectively receiving 1106 the remote audio stream if an affirmative response 1105 is received. The system can execute an operation of selectively playing 1108 the remote audio stream through an electroacoustic transducer if an affirmative response 1105 is received.

Figure 12:
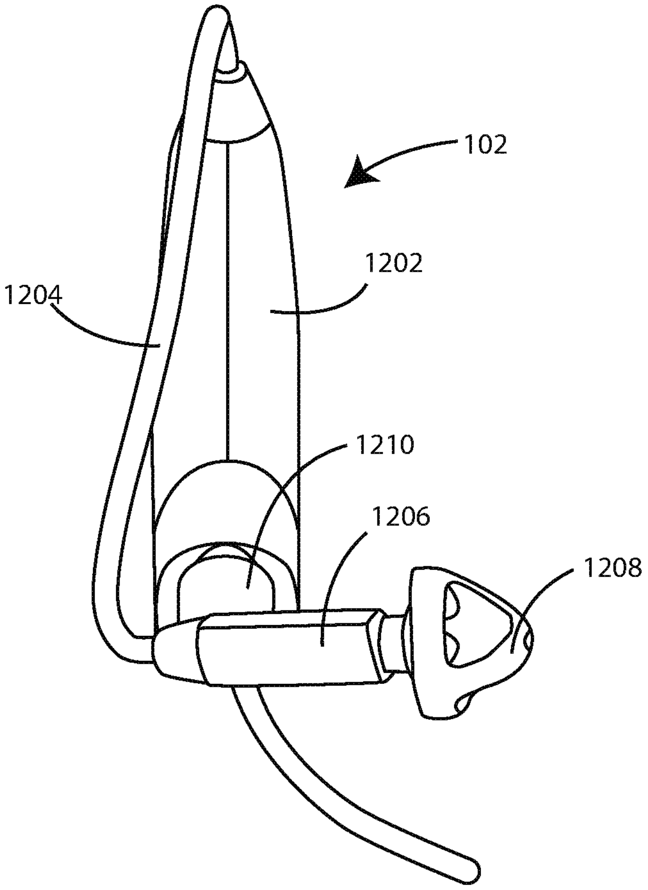
FIG. 12 is a schematic view of an ear-worn device in accordance with various embodiments herein.

Referring now to FIG. 12, a schematic view of an ear-worn device 102 is shown in accordance with various embodiments herein. The ear-worn device 102 can include a hearing device housing 1202. The hearing device housing 1202 can define a battery compartment 1210 into which a battery can be disposed to provide power to the device. The ear-worn device 102 can also include a receiver 1206 adjacent to an earbud 1208. The receiver 1206 an include a component that converts electrical impulses into sound, such as an electroacoustic transducer, speaker, or loud speaker. Such components can be used to generate an audible stimulus in various embodiments herein. A cable 1204 or connecting wire can include one or more electrical conductors and provide electrical communication between components inside of the hearing device housing 1202 and components inside of the receiver 1206.

The ear-worn device 102 shown in FIG. 12 is a receiver-in-canal type device and thus the receiver is designed to be placed within the ear canal. However, it will be appreciated that may different form factors for ear-worn devices are contemplated herein. As such, ear-worn devices herein can include, but are not limited to, behind-the-ear (BTE), in-the ear (ITE), in-the-canal (ITC), invisible-in-canal (IIC), receiver-in-canal (RIC), receiver in-the-ear (RITE) and completely-in-the-canal (CIC) type hearing assistance devices.

The term "ear-worn device" shall also refer to devices that can produce optimized or processed sound for persons with normal hearing. Ear-worn devices herein can include hearing assistance devices. In some embodiments, the ear-worn device can be a hearing aid falling under 21 C.F.R. § 801.420. In another example, the ear-worn device can include one or more Personal Sound Amplification Products (PSAPs). In another example, the ear-worn device can include one or more cochlear implants, cochlear implant magnets, cochlear implant transducers, and cochlear implant processors. In another example, the ear-worn device can include one or more "hearable" devices that provide various types of functionality. In other examples, ear-worn devices can include other types of devices that are wearable in, on, or in the vicinity of the user's ears. In other examples, ear-worn devices can include other types of devices that are implanted or otherwise osseointegrated with the user's skull; wherein the device is able to facilitate stimulation of the wearer's ears via the bone conduction pathway.

Ear-worn devices of the present disclosure can incorporate an antenna arrangement coupled to a radio, such as a 2.4 GHz radio. The radio can conform to an IEEE 802.11 (e.g., WIFI®) or BLUETOOTH® (e.g., BLE, BLUETOOTH® 4.2 or 5.0) specification, for example. It is understood that ear-worn devices of the present disclosure can employ other radios, such as a 900 MHz radio. Ear-worn devices of the present disclosure can be configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files.

Figure 13:
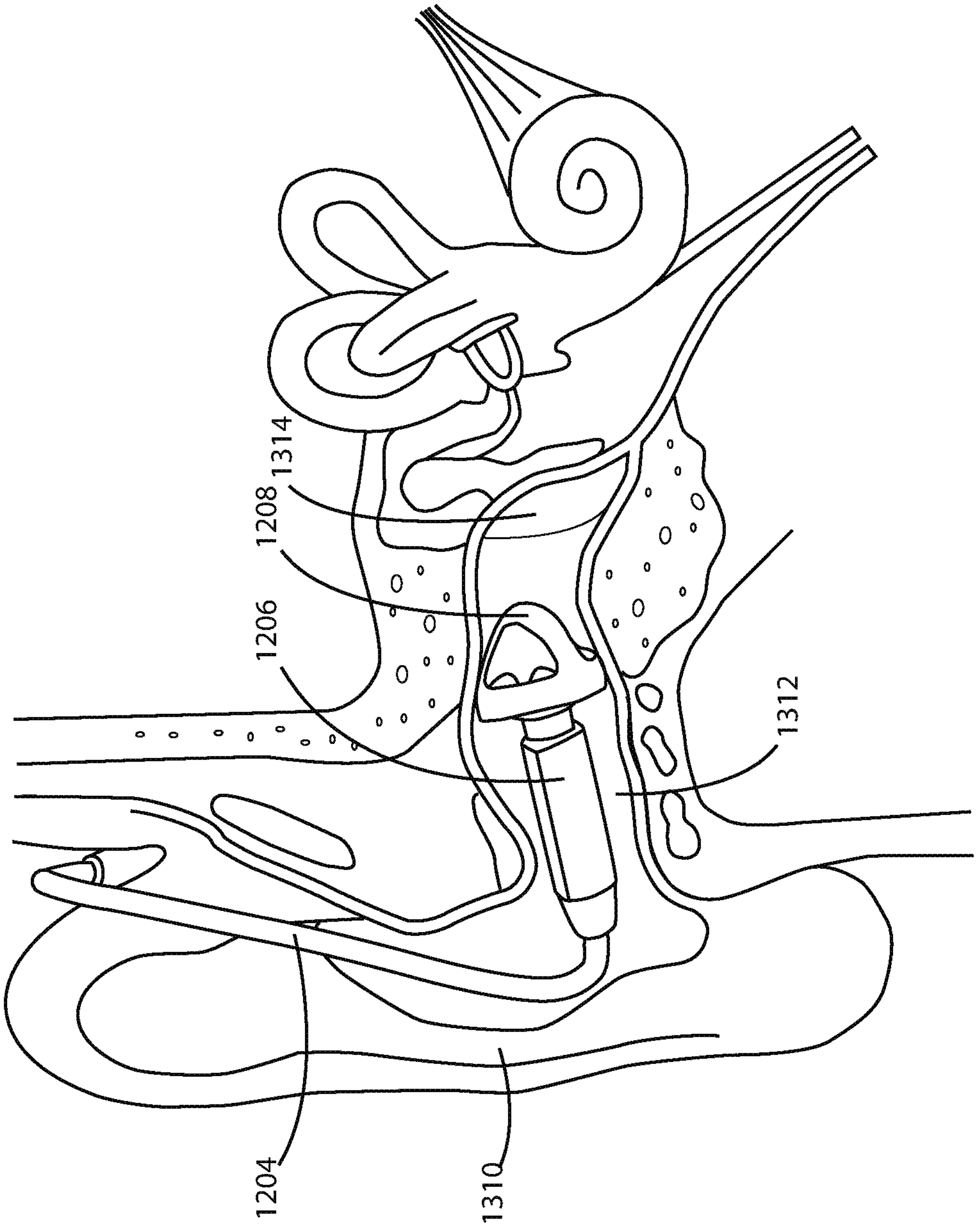
FIG. 13 is a schematic view of an ear-worn device within an ear of a device wearer in accordance with various embodiments herein.

As mentioned above, the ear-worn device 102 shown in FIG. 12 can be a receiver-in-canal type device and thus the receiver is designed to be placed within the ear canal. Referring now to FIG. 13, a schematic view is shown of an ear-worn device 102 disposed within the ear of a subject in accordance with various embodiments herein. In this view, the receiver 1206 and the earbud 1208 are both within the ear canal 1312, but do not directly contact the tympanic membrane 1314. The hearing device housing is mostly obscured in this view behind the pinna 1310, but it can be seen that the cable 1204 passes over the top of the pinna 1310 and down to the entrance to the ear canal 1312.

Figure 14:
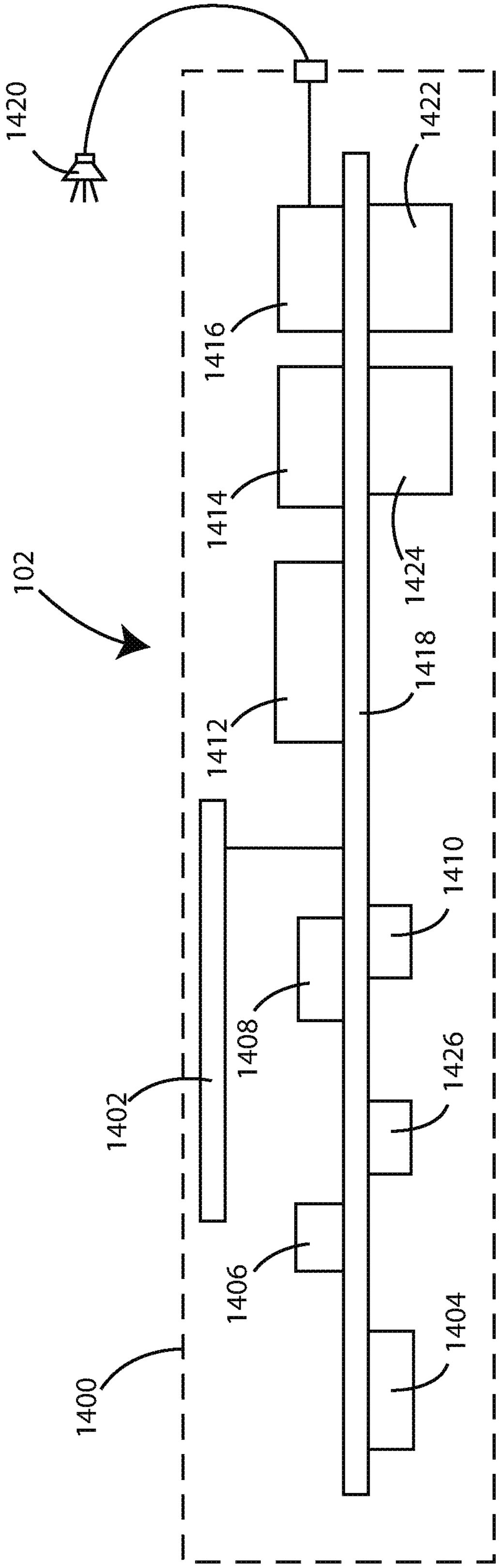
FIG. 14 is a schematic block diagram of components of an ear-worn device in accordance with various embodiments herein.

Referring now to FIG. 14, a schematic block diagram of components of an ear-worn device is shown in accordance with various embodiments herein. The block diagram of FIG. 14 represents a generic ear-worn device for purposes of illustration. The ear-worn device 102 shown in FIG. 14 includes several components electrically connected to a flexible mother circuit 1418 (e.g., flexible mother board) which is disposed within housing 1400. A power supply circuit 1404 can include a battery and can be electrically connected to the flexible mother circuit 1418 and provides power to the various components of the ear-worn device 102. One or more microphones 1406 are electrically connected to the flexible mother circuit 1418, which provides electrical communication between the microphones 1406 and a digital signal processor (DSP) 1412. Among other components, the DSP 1412 incorporates or is coupled to audio signal processing circuitry configured to implement various functions described herein. A sensor package 1414 can be coupled to the DSP 1412 via the flexible mother circuit 1418. The sensor package 1414 can include one or more different specific types of sensors such as those described in greater detail below. One or more user switches 1410 (e.g., on/off, volume, mic directional settings) are electrically coupled to the DSP 1412 via the flexible mother circuit 1418.

An audio output device 1416 is electrically connected to the DSP 1412 via the flexible mother circuit 1418. In some embodiments, the audio output device 1416 comprises an electroacoustic transducer or speaker (coupled to an amplifier). In other embodiments, the audio output device 1416 comprises an amplifier coupled to an external receiver 1420 adapted for positioning within an ear of a wearer. The external receiver 1420 can include an electroacoustic transducer, speaker, or loud speaker. The ear-worn device 102 may incorporate a communication device 1408 coupled to the flexible mother circuit 1418 and to an antenna 1402 directly or indirectly via the flexible mother circuit 1418. The communication device 1408 can be a BLUETOOTH® transceiver, such as a BLE (BLUETOOTH® low energy) transceiver or other transceiver(s) (e.g., an IEEE 802.11 compliant device). The communication device 1408 can be configured to communicate with one or more external devices, such as those discussed previously, in accordance with various embodiments. In various embodiments, the communication device 1408 can be configured to communicate with an external visual display device such as a smart phone, a video display screen, a tablet, a computer, or the like.

In various embodiments, the ear-worn device 102 can also include a control circuit 1422 and a memory storage device 1424. The control circuit 1422 can be in electrical communication with other components of the device. In some embodiments, a clock circuit 1426 can be in electrical communication with the control circuit. The control circuit 1422 can execute various operations, such as those described herein. The control circuit 1422 can include various components including, but not limited to, a microprocessor, a microcontroller, an FPGA (field-programmable gate array) processing device, an ASIC (application specific integrated circuit), or the like. The memory storage device 1424 can include both volatile and non-volatile memory. The memory storage device 1424 can include ROM, RAM, flash memory, EEPROM, SSD devices, NAND chips, and the like. The memory storage device 1424 can be used to store data from sensors as described herein and/or processed data generated using data from sensors as described herein.

It will be appreciated that various of the components described in FIG. 14 can be associated with separate devices and/or accessory devices to the ear-worn device. By way of example, microphones can be associated with separate devices and/or accessory devices. Similarly, audio output devices can be associated with separate devices and/or accessory devices to the ear-worn device.

Accessory devices herein can include various different components. In some embodiments, the accessory device can be a personal communications device, such as a smart phone. However, the accessory device can also be other things such as a wearable device, a handheld computing device, a dedicated location determining device (such as a handheld GPS unit), or the like.

Figure 15:
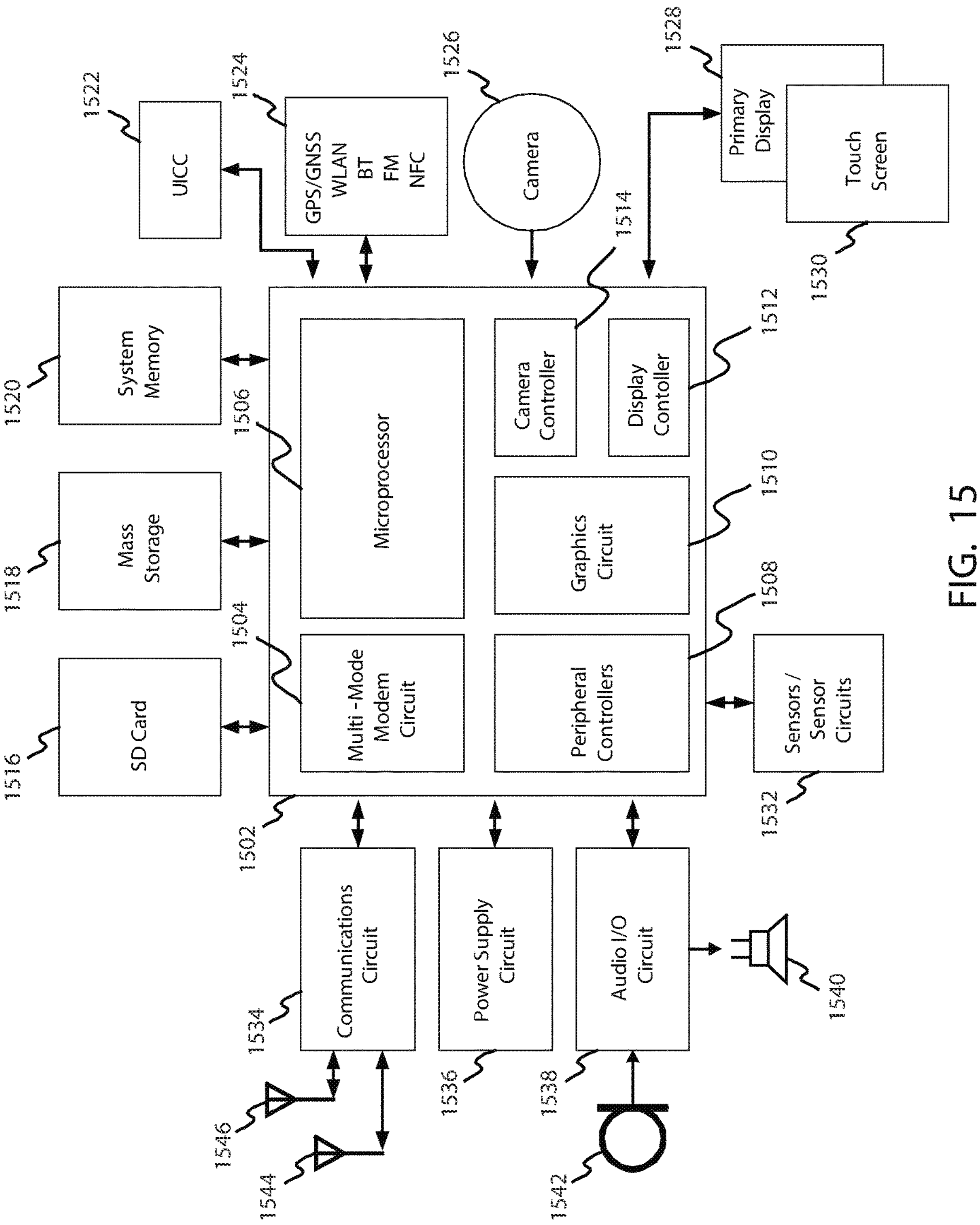
FIG. 15 is a schematic block diagram of components of an exemplary accessory device in accordance with various embodiments herein.

Referring now to FIG. 15, a schematic block diagram is shown of components of an accessory device (which could be a personal communications device or another type of accessory device) in accordance with various embodiments herein. This block diagram is just provided by way of illustration and it will be appreciated that accessory devices can include greater or lesser numbers of components. The accessory device in this example can include a control circuit 1502. The control circuit 1502 can include various components which may or may not be integrated. In various embodiments, the control circuit 1502 can include a microprocessor 1506, which could also be a microcontroller, FPGA, ASIC, or the like. The control circuit 1502 can also include a multi-mode modem circuit 1504 which can provide communications capability via various wired and wireless standards. The control circuit 1502 can include various peripheral controllers 1508. The control circuit 1502 can also include various sensors/sensor circuits 1532. The control circuit 1502 can also include a graphics circuit 1510, a camera controller 1514, and a display controller 1512. In various embodiments, the control circuit 1502 can interface with an SD card 1516, mass storage 1518, and system memory 1520. In various embodiments, the control circuit 1502 can interface with universal integrated circuit card (UICC) 1522. A spatial location determining circuit can be included and can take the form of an integrated circuit 1524 that can include components for receiving signals from GPS, GLONASS, BeiDou, Galileo, SBAS, WLAN, BT, FM, and NFC type protocols. In various embodiments, the accessory device can include a camera 1526. In various embodiments, the control circuit 1502 can interface with a primary display 1528 that can also include a touch screen 1530. In various embodiments, an audio I/O circuit 1538 can interface with the control circuit 1502 as well as a microphone 1542 and a speaker 1540. In various embodiments, a power supply circuit 1536 can interface with the control circuit 1502 and/or various other circuits herein in order to provide power to the system. In various embodiments, a communications circuit 1534 can be in communication with the control circuit 1502 as well as one or more antennas (1544, 1546).

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method of operating an audio system can include receiving a notification regarding availability of a remote audio stream. The notification can be generated by a device (such as a remote device). In some embodiments, the notification can be received via an accessory device. However, in some embodiments, the notification can be received directly by an ear-worn device. In various embodiments, the method can include querying a wearer of an ear-worn device regarding the remote audio stream. For example, the system can ask the wearer whether they want to start listening to the audio stream. In various embodiments, the method can also include receiving an input from the wearer of the ear-worn device regarding the remote audio stream (accept, reject, hold, message, etc). If the response from the device wearer is affirmative, then the method can include receiving the remote audio stream and playing the remote audio stream through an electroacoustic transducer that can be associated with the ear-worn device. In some embodiments, an audio stream is not actually created and sent unit after an affirmative response from the device wearer, which can then be communicated back through a data network to a device (such as a remote device) which can then start generating and transmitting the audio stream.

In an embodiment, the method can further include pausing or ceasing a preexisting audio channel/stream being provided to the device wearer and automatically beginning to play the remote audio stream through the electroacoustic transducer when the remote audio stream originates from a prioritized location, such as a home location of the ear-worn device wearer.

In an embodiment, the method can further include automatically beginning to play the remote audio stream through the electroacoustic transducer if the ear-worn device is streaming audio from a wireless source when the notification regarding availability of a remote audio stream is received.

In an embodiment, the method can further include combining the remote audio stream with a hearing assistance audio output generated the ear-worn device and then playing the combination through the electroacoustic transducer.

In an embodiment, the method can further include receiving input from the ear-worn device wearer regarding a balance of output between the remote audio stream and a hearing assistance audio output.

In an embodiment, the method can further include receiving input from the ear-worn device wearer such that detecting the ear-worn device wearer contacting the ear-worn device causes a mixing parameter, such as a balance of output between the remote audio stream and a hearing assistance audio output, to change.

In an embodiment, the method can further include receiving input from the ear-worn device wearer such that detecting the ear-worn device wearer contacting the ear-worn device causes a hearing assistance audio output to be suspended.

In an embodiment, the method can further include receiving the input originating from the wearer of the ear-worn device regarding the remote audio stream from the accessory device as a voice command. In an embodiment, the method can further include receiving the input originating from the wearer of the ear-worn device regarding the remote audio stream from the accessory device as a head gesture. In an embodiment, the method can further include receiving the input originating from the wearer of the ear-worn device regarding the remote audio stream from the accessory device as a tactile input.

In an embodiment, the method can further include receiving audio input from a microphone (such as of the ear-worn device) and sending the audio input to an accessory device. In an embodiment, the method can further include receiving audio input from a microphone and sending the audio input to a remote device.

In an embodiment, the method can further include classifying the notification and initiating receipt of the remote audio stream based on the classification. In an embodiment, the method can further include classifying the notification for third-party conveyance and conveying the remote audio stream to a third-party.

Sensors

Ear-worn devices herein can include one or more sensor packages (including one or more discrete or integrated sensors) to provide data. The sensor package can comprise one or a multiplicity of sensors. In some embodiments, the sensor packages can include one or more motion sensors amongst other types of sensors. Motion sensors herein can include inertial measurement units (IMU), accelerometers, gyroscopes, barometers, altimeters, and the like. The IMU can be of a type disclosed in commonly owned U.S. patent application Ser. No. 15/331,230, filed Oct. 21, 2016, which is incorporated herein by reference. In some embodiments, electromagnetic communication radios or electromagnetic field sensors (e.g., telecoil, NFMI, TMR, GMR, magnetometer, including Hall effect and flux gate magnetometers, etc.) may be used to detect motion or changes in position. In some embodiments, biometric sensors may be used to detect body motions or physical activity. Motions sensors can be used to track movement of a patient in accordance with various embodiments herein.

In some embodiments, the motion sensors can be disposed in a fixed position with respect to the head of a patient, such as worn on or near the head or ears. In some embodiments, the operatively connected motion sensors can be worn on or near another part of the body such as on a wrist, arm, or leg of the patient.

According to various embodiments, the sensor package can include one or more of a motion sensor, (e.g., IMU, and accelerometer (3, 6, or 9 axis), a gyroscope, a barometer, an altimeter, a magnetometer, a magnetic sensor, an eye movement sensor, a pressure sensor), an acoustic sensor, a telecoil, a heart rate sensor, a global positioning system (GPS), a barometer, a temperature sensor, a blood pressure sensor, an oxygen saturation sensor, an optical sensor, a blood glucose sensor (optical or otherwise), a galvanic skin response sensor, a cortisol level sensor (optical or otherwise), a microphone, acoustic sensor, an electrocardiogram (ECG) sensor, electroencephalography (EEG) sensor which can be a neurological sensor, eye movement sensor (e.g., electrooculogram (EOG) sensor), myographic potential electrode sensor (EMG), a heart rate monitor, a pulse oximeter, a wireless radio antenna, blood perfusion sensor, hydrometer, sweat sensor, cerumen sensor, air quality sensor, pupillometry sensor, cortisol level sensor, hematocrit sensor, light sensor, image sensor, and the like.

In some embodiments, the sensor package can be part of an ear-worn device. However, in some embodiments, the sensor packages can include one or more additional sensors that are external to an ear-worn device. For example, various of the sensors described above can be part of a wrist-worn or ankle-worn sensor package, or a sensor package supported by a chest strap.

Data produced by the sensor(s) of the sensor package can be operated on by a processor of the device or system.

As used herein the term "inertial measurement unit" or "IMU" shall refer to an electronic device that can generate signals related to a body's specific force and/or angular rate. IMUs herein can include one or more accelerometers and gyroscopes (3, 6, or 9 axis) to detect linear acceleration and a gyroscope to detect rotational rate. In some embodiments, an IMU can also include a magnetometer to detect a magnetic field.

The eye movement sensor may be, for example, an electrooculographic (EOG) sensor, such as an EOG sensor disclosed in commonly owned U.S. Pat. No. 9,167,356, which is incorporated herein by reference. The pressure sensor can be, for example, a MEMS-based pressure sensor, a piezo-resistive pressure sensor, a flexion sensor, a strain sensor, a diaphragm-type sensor and the like.

The temperature sensor can be, for example, a thermistor (thermally sensitive resistor), a resistance temperature detector, a thermocouple, a semiconductor-based sensor, an infrared sensor, or the like.

The blood pressure sensor can be, for example, a pressure sensor. The heart rate sensor can be, for example, an electrical signal sensor, an acoustic sensor, a pressure sensor, an infrared sensor, an optical sensor, or the like.

The oxygen saturation sensor (such as a blood oximetry sensor) can be, for example, an optical sensor, an infrared sensor, or the like.

The electrical signal sensor can include two or more electrodes and can include circuitry to sense and record electrical signals including sensed electrical potentials and the magnitude thereof (according to Ohm's law where V=IR) as well as measure impedance from an applied electrical potential.

It will be appreciated that the sensor package can include one or more sensors that are external to the ear-worn device. In addition to the external sensors discussed hereinabove, the sensor package can comprise a network of body sensors (such as those listed above) that sense movement of a multiplicity of body parts (e.g., arms, legs, torso). In some embodiments, the ear-worn device can be in electronic communication with the sensors or processor of a medical device (implantable, wearable, external, etc.).

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.). The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. An audio system comprising:

an ear-worn device comprising
- a control circuit;
- an electroacoustic transducer in electronic communication with the control circuit;
- at least one microphone in electronic communication with the control circuit;
- a wireless communications circuit in communication with the control circuit;

wherein the audio system is configured to:
- receive a notification regarding availability of a remote audio stream, wherein the notification regarding availability of the remote audio stream is initiated by a trigger event sensed by a remote device, the trigger event comprising an audio signal that does not originate from a wearer of the ear-worn device;
- query the wearer of the ear-worn device regarding the remote audio stream;
- receive an input from the wearer of the ear-worn device regarding the remote audio stream;
- selectively receive the remote audio stream; and
- selectively play the remote audio stream through the electroacoustic transducer.

2. The audio system of claim 1, wherein the ear-worn device automatically begins to play the remote audio stream through the electroacoustic transducer when the remote audio stream originates from a designated priority location.

3. The audio system of claim 2, wherein the designated priority location is a home location of the ear-worn device wearer.

4. The audio system of claim 1, wherein the control circuit is configured to prioritize simultaneous audio streams by at least one of time and auditory volume.

5. The audio system of claim 1, wherein the ear-worn device automatically begins to play the remote audio stream through the electroacoustic transducer if the ear-worn device is streaming audio from a wireless source when the notification regarding availability of a remote audio stream is received.

6. The audio system of claim 1, wherein the ear-worn device switches from playing a preexisting audio stream to playing the remote audio stream at a first time point, then switches back to playing the preexisting audio stream starting at a time point in the preexisting audio stream that is prior to the first time point.

7. The audio system of claim 1, wherein the ear-worn device switches from providing corrective audio or an ambient sound output to playing the remote audio stream at a first time point, then switches back to providing corrective audio or an ambient sound output, and announces a name of a speaker at a time of switching back to providing corrective audio or an ambient sound output.

8. The audio system of claim 1, wherein the audio system is configured to combine the remote audio stream with a corrective audio or an ambient sound output generated by the ear-worn device and then play the combination through the electroacoustic transducer.

9. The audio system of claim 1, further comprising
a second ear-worn device,
wherein the audio system is configured to play a different audio channel in each ear.

10. The audio system of claim 9, wherein the audio system plays the remote audio stream through one of the ear-worn devices and a corrective audio or an ambient sound output through the other ear-worn device.

11. The audio system of claim 10, wherein the audio system determines which ear to play the remote audio stream through based on an orientation of the wearer of the ear-worn device with respect to a source of the remote audio stream.

12. The audio system of claim 1, the trigger event comprising sound indicative of emotional stress exceeding a threshold value.

13. The audio system of claim 1, wherein the remote device is not held or worn by the wearer.

14. The audio system of claim 1, wherein the ear-worn device is disposed in a first location, and the remote device is disposed in a second location, wherein the second location is out of normal audible range of the first location.

15. The audio system of claim 14, wherein the audio signal originates from the second location.

16. An audio system comprising:
an ear-worn device comprising
a control circuit;
an electroacoustic transducer in electronic communication with the control circuit;
at least one microphone in electronic communication with the control circuit;
a wireless communications circuit in communication with the control circuit;
wherein the audio system is configured to
receive a notification regarding availability of a remote audio stream;
query a wearer of the ear-worn device regarding the remote audio stream;
receive an input from the wearer of the ear-worn device regarding the remote audio stream;
selectively receive the remote audio stream; and
selectively play the remote audio stream through the electroacoustic transducer; and
at the control circuit, automatically classify the notification regarding availability of a remote audio stream for possible third-party conveyance and convey the remote audio stream to a third-party device if so classified.

17. The audio system of claim 16, wherein upon detecting any of a plurality of predetermined sounds in the remote audio stream, the control circuit is configured to automatically classify the remote audio stream for third-party conveyance and to convey the remote audio stream to the third-party device.

18. An audio system comprising:
an ear-worn device comprising
a control circuit;
an electroacoustic transducer in electronic communication with the control circuit;
at least one microphone in electronic communication with the control circuit;
a wireless communications circuit in communication with the control circuit;
wherein the audio system is configured to
receive a notification regarding availability of a remote audio stream;
query a wearer of the ear-worn device regarding the remote audio stream;
receive an input from the wearer of the ear-worn device regarding the remote audio stream;
store a plurality of locations in a memory, each location having an associated priority level;
selectively receive the remote audio stream from one of the plurality of locations;
classify the notification based on the priority level associated with the location of the remote audio stream;
initiate receipt of the remote audio stream based on the classification; and
selectively play the remote audio stream through the electroacoustic transducer.

19. The audio system of claim 18, wherein the audio system is configured to:
upon receiving a plurality of simultaneous audio streams, selectively play the remote audio stream originating from the location with the highest associated priority level through the electroacoustic transducer.

20. The audio system of claim 18, wherein the plurality of predetermined sounds comprise any of an infant crying, glass breakage, a request for help, a sound exceeding a threshold volume, running water, or an alarm.

* * * * *